US009959516B2

(12) United States Patent
Takata et al.

(10) Patent No.: US 9,959,516 B2
(45) Date of Patent: May 1, 2018

(54) DISASSEMBLY PROCEDURE GENERATING METHOD, APPARATUS, AND SYSTEM, AND REPLACEMENT PROCEDURE GENERATING METHOD, APPARATUS, AND SYSTEM

(71) Applicant: OLYMPUS CORPORATION, Shibuya-ku, Tokyo (JP)

(72) Inventors: Jumpei Takata, Tokyo (JP); Yusuke Takahashi, Tokyo (JP); Hitomi Ohana, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 410 days.

(21) Appl. No.: 14/673,007

(22) Filed: Mar. 30, 2015

(65) Prior Publication Data
US 2015/0206085 A1    Jul. 23, 2015

Related U.S. Application Data

(63) Continuation of application No. PCT/JP2014/050282, filed on Jan. 10, 2014.

(30) Foreign Application Priority Data

Feb. 13, 2013   (JP) ................................ 2013-025137

(51) Int. Cl.
*G06Q 10/00*   (2012.01)
*G06Q 10/06*   (2012.01)
*G05B 19/418*  (2006.01)

(52) U.S. Cl.
CPC ..... *G06Q 10/06315* (2013.01); *G05B 19/418* (2013.01); *G06Q 10/06316* (2013.01);
(Continued)

(58) Field of Classification Search
CPC ....... G06Q 10/06315; G06Q 10/06316; G05B 2219/31066
(Continued)

(56) References Cited

U.S. PATENT DOCUMENTS 6,725,184 B1 * 4/2004 Gadh ............... G05B 19/41805
700/95
2004/0138771 A1 * 7/2004 Mok ................ G05B 19/41805
700/95
(Continued)

FOREIGN PATENT DOCUMENTS

JP    10240324 A    9/1998
JP    2007007740 A  1/2007
(Continued)

OTHER PUBLICATIONS

International Search Report (ISR) dated Feb. 4, 2014 issued in International Application No. PCT/JP2014/050282.

*Primary Examiner* — Sujay Koneru
(74) *Attorney, Agent, or Firm* — Holtz, Holtz & Volek PC

(57) ABSTRACT

A disassembly procedure generating apparatus is configured to include: an assembly procedure editing unit that incorporates a new work element into an assembly procedure; an assembly procedure change monitoring unit that performs monitoring as to whether a new work element has been inserted into the assembly procedure; a disassembly procedure generating unit that generates, when a new work element is inserted into the assembly procedure, a disassembly procedure by using work elements of the assembly procedure into which the new work element has been inserted and by using information associating the work elements of the assembly procedure with work elements of the disassembly procedure; a disassembly procedure cost calculating unit that calculates a cost generated for the entirety of the disassembly procedure; and a procedure cost
(Continued)

information displaying unit that displays, together with the assembly procedure, the disassembly procedure and the cost generated for the entirety of the disassembly procedure.

5 Claims, 35 Drawing Sheets

(52) U.S. Cl.
CPC ..... *G05B 2219/31066* (2013.01); *Y02P 90/02* (2015.11); *Y02P 90/04* (2015.11)

(58) Field of Classification Search
USPC .............................................. 705/7.26, 343
See application file for complete search history.

(56) References Cited

U.S. PATENT DOCUMENTS

| | | | | |
|---|---|---|---|---|
| 2006/0053071 | A1* | 3/2006 | Yamada | G06F 17/50 705/29 |
| 2006/0085088 | A1 | 4/2006 | Nakayama et al. | |
| 2006/0122721 | A1* | 6/2006 | Ouchi | G05B 19/41875 700/105 |
| 2007/0198289 | A1* | 8/2007 | Hiroshige | G06Q 10/06 705/1.1 |
| 2008/0046254 | A1* | 2/2008 | Nuno | G06Q 10/20 705/305 |
| 2008/0165189 | A1 | 7/2008 | Nakayama et al. | |
| 2009/0248545 | A1* | 10/2009 | Robinson | G06Q 30/0601 705/26.1 |
| 2009/0265025 | A1* | 10/2009 | Brown | B01J 19/0006 700/98 |
| 2012/0191496 | A1* | 7/2012 | Muench | G06Q 10/063 705/7.13 |

FOREIGN PATENT DOCUMENTS

| | | |
|---|---|---|
| JP | 2009193489 A | 8/2009 |
| JP | 2010182083 A | 8/2010 |
| WO | 2004109602 A1 | 12/2004 |

* cited by examiner

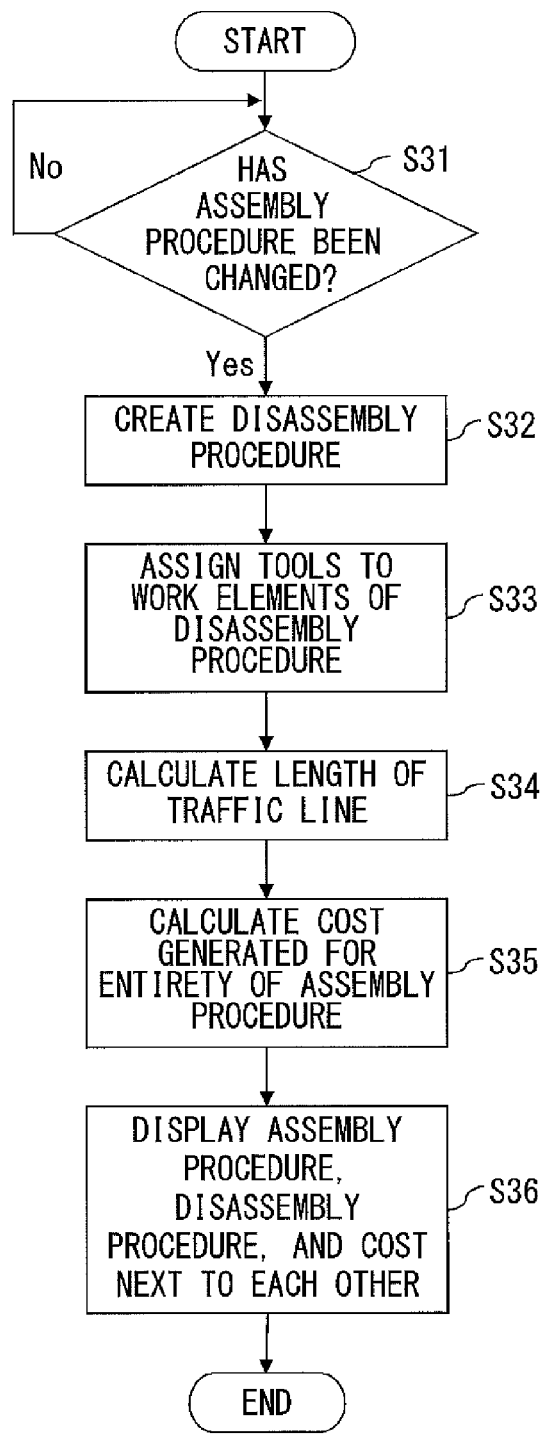
F I G. 3

| WORK ID | WORK ELEMENT | HANDLING OF PART | WORK COST |
|---|---|---|---|
| APT0 | N/A | UNITIZE COMPONENTS | XXX YEN |
| APT1 | SCREW REMOVAL | NO CHANGE | YYY YEN |
| APT2 | CUT | NO CHANGE | ZZZ YEN |

F I G. 4

```
<ASSEMBLY PROCEDURE PRODUCT NAME="PRODUCT X" >
  <PROCESS ID="ASM1", ASSEMBLY WORK NAME="SCREW TIGHTENING", WORK ID="APT1" >
    <TOOL TOOL NAME="ELECTRIC SCREW DRIVER B" />
    <PART ID="PRT1", PART NAME="SCREW", NUMBER="4" />
  <PROCESS ID="ASM1", ASSEMBLY PRODUCT NAME="SCREW TIGHTENING", DISASSEMBLY WORK ID="APT1" >
    <TOOL TOOL NAME="ELECTRIC SCREW DRIVER A" />
    <PART NAME ID="PRT1", PART NAME="SCREW", NUMBER="4" />
    <PART NAME ID="PRT2", PART NAME="PART A", NUMBER="1" />
    <PART NAME ID="PRT5", PART NAME="PART B", NUMBER="1" />
  </PROCESS>
  <PROCESS ID="ASM2", ASSEMBLY WORK NAME="ADHESION", WORK ID="APT0" >
    <TOOL TOOL NAME="ADHESION POSITION ADJUSTING TOOL C" />
    <PART NAME ID="PRT4", PART NAME="PART C", NUMBER="1" />
    <PART NAME ID="PRT5", PART NAME="PART D", NUMBER="1" />
  </PROCESS>
</ASSEMBLY PROCEDURE>
```

```
<DISASSEMBLY PROCEDURE PRODUCT NAME="PRODUCT X" >
  <PROCESS ID="APT1", DISASSEMBLY WORK NAME="SCREW REMOVAL" >
    <TOOL TOOL NAME="ELECTRIC SCREW DRIVER B" />
    <PART ID="PRT4", PART NAME="SCREW", NUMBER="4" />
  <PROCESS ID="APT1", ASSEMBLY WORK NAME="SCREW REMOVAL" >
    <TOOL TOOL NAME="ELECTRIC SCREW DRIVER A" />
    <PART ID="PRT5", PART NAME="PART C", NUMBER="1" />
    <PART ID="PRT6", PART NAME="PART D", NUMBER="1" />
  </PROCESS>
    <UNIT ID="UNT1" >
      <PART ID="PRT4", PART NAME="PART C", NUMBER="1" />
      <PART ID="PRT5", PART NAME="PART D", NUMBER="1" />
    </UNIT>
  </PROCESS>
</DISASSEMBLY PROCEDURE>
```

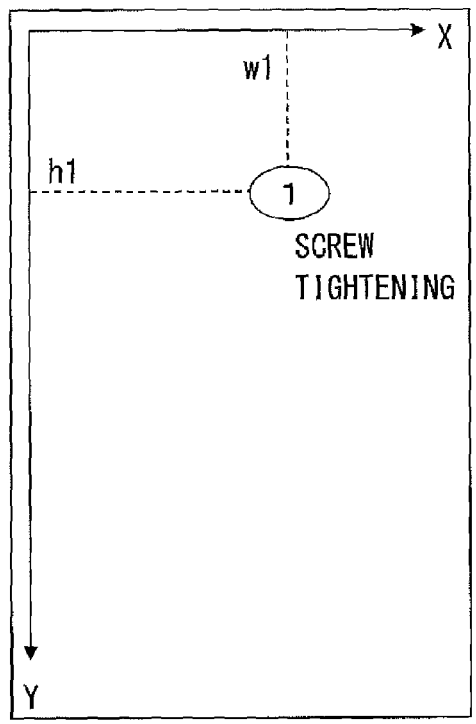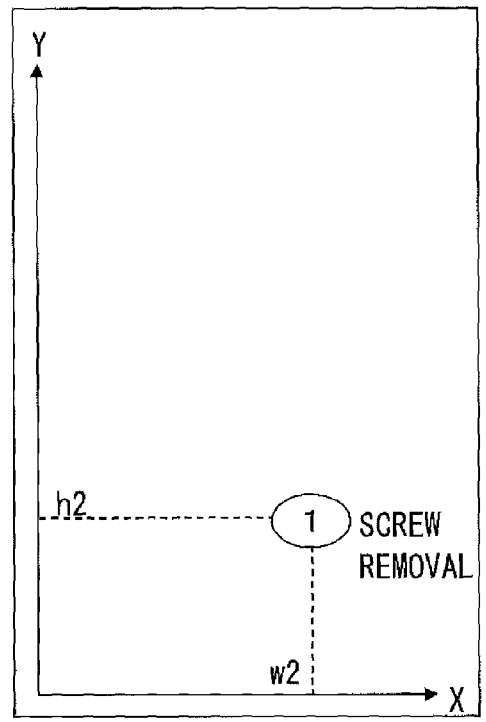
FIG. 7

| ASSEMBLY TOOL | LOCATION ID | DISASSEMBLY TOOL |
|---|---|---|
| ELECTRIC SCREW DRIVER A | SITE1 | CROSS-RECESSED SCREW DRIVER S1A |
| ELECTRIC SCREW DRIVER A | SITE2 | ELECTRIC SCREW DRIVER S2A |
| ELECTRIC SCREW DRIVER A | SITE3 | CROSS-RECESSED SCREW DRIVER S3A |
| ELECTRIC SCREW DRIVER B | SITE1 | CROSS-RECESSED SCREW DRIVER S1B |
| ELECTRIC SCREW DRIVER B | SITE2 | ELECTRIC SCREW DRIVER S2B |
| ELECTRIC SCREW DRIVER B | SITE3 | CROSS-RECESSED SCREW DRIVER S3B |

FIG. 8

```
<DISASSEMBLY PROCEDURE  PRODUCT NAME=" PRODUCT X" >
<PROCESS ID=" APT1" , DISASSEMBLY WORK NAME=" SCREW REMOVAL" >
    <TOOL LOCATION ID=" SITE1" , TOOL NAME=" CROSS-RECESSED SCREW DRIVER S1B" />
    <TOOL LOCATION ID=" SITE2" , TOOL NAME=" ELECTRIC SCREW DRIVER S2B" />
    <TOOL LOCATION ID=" SITE3" , TOOL NAME=" CROSS-RECESSED SCREW DRIVER S3B" />
    <PART ID=" PRT4" , PART NAME=" SCREW" , NUMBER=" 4" />
<PROCESS ID=" APT2" , ASSEMBLY WORK NAME=" SCREW REMOVAL" >
    <TOOL LOCATION ID=" SITE1" , TOOL NAME=" CROSS-RECESSED SCREW DRIVER S1A" />
    <TOOL LOCATION ID=" SITE2" , TOOL NAME=" ELECTRIC SCREW DRIVER S2A" />
    <TOOL LOCATION ID=" SITE3" , TOOL NAME=" CROSS-RECESSED SCREW DRIVER S3A" />
    <PART ID=" PRT5" , PART NAME=" PART C" , NUMBER=" 1" />
    <PART ID=" PRT6" , PART NAME=" PART D" , NUMBER=" 1" />
</PROCESS>
<UNIT ID=" UNT1" >
    <PART ID=" PRT4" , PART NAME=" PART C" , NUMBER=" 1" />
    <PART ID=" PRT5" , PART NAME=" PART D" , NUMBER=" 1" />
</UNIT>
</PROCESS>
</DISASSEMBLY PROCEDURE>
```

F I G. 9

```
<ASSEMBLY PROCEDURE PRODUCT NAME="PRODUCT X">
  <PROCESS ID="ASM1", ASSEMBLY WORK NAME="SCREW TIGHTENING", DISASSEMBLY WORK ID="APT1">
    <TOOL TOOL NAME="ELECTRIC SCREW DRIVER B" />
  <PROCESS ID="ASM1", ASSEMBLY WORK NAME="SCREW TIGHTENING", DISASSEMBLY WORK ID="APT1">
    <TOOL TOOL NAME="ELECTRIC SCREW DRIVER A" />
    <PART ID="PRT1", PART NAME="SCREW", NUMBER="4" />
    <PART ID="PRT2", PART NAME="PART A", NUMBER="1" />
    <PART ID="PRT5", PART NAME="PART B", NUMBER="1" />
  </PROCESS>
  <PROCESS ID="ASM2", ASSEMBLY WORK NAME="ADHESION", DISASSEMBLY WORK ID="APT0">
    <TOOL TOOL NAME="ADHESION POSITION ADJUSTING TOOL C" />
    <PART ID="PRT4", PART NAME="PART C", NUMBER="1" />
    <PART ID="PRT5", PART NAME="PART D", NUMBER="1" />
  </PROCESS>
</ASSEMBLY PROCEDURE>
```

F I G. 1 5

```
<ASSEMBLY PROCEDURE PRODUCT NAME=" PRODUCT X" >
  <PROCESS ID=" ASM1" , ASSEMBLY WORK NAME=" SCREW TIGHTENING" , DISASSEMBLY WORK ID=" APT1" >
    <TOOL TOOL NAME=" ELECTRIC SCREW DRIVER B" />
    <PART ID=" PRT1" , PART NAME=" SCREW" , NUMBER=" 4" />
  <PROCESS ID=" ASM1" , ASSEMBLY WORK NAME=" SCREW TIGHTENING" , DISASSEMBLY WORK ID=" APT1" >
    <TOOL TOOL NAME=" ELECTRIC SCREW DRIVER A" />
    <PART ID=" PRT1" , PART NAME=" SCREW" , NUMBER=" 4" />
    <PART ID=" PRT2" , PART NAME=" PART A" , NUMBER=" 1" />
    <PART ID=" PRT5" , PART NAME=" PART B" , NUMBER=" 1" />
  </PROCESS>
  <PROCESS ID=" ASM2" , ASSEMBLY WORK NAME=" ADHESION" , DISASSEMBLY WORK ID=" APT0" >
    <TOOL TOOL NAME=" ADHESION POSITION ADJUSTING TOOL C" />
    <PART ID=" PRT4" , PART NAME=" PART C" , NUMBER=" 1" />
    <PART ID=" PRT5" , PART NAME=" PART D" , NUMBER=" 1" />
  </PROCESS>
</ASSEMBLY PROCEDURE>
```

FIG. 18

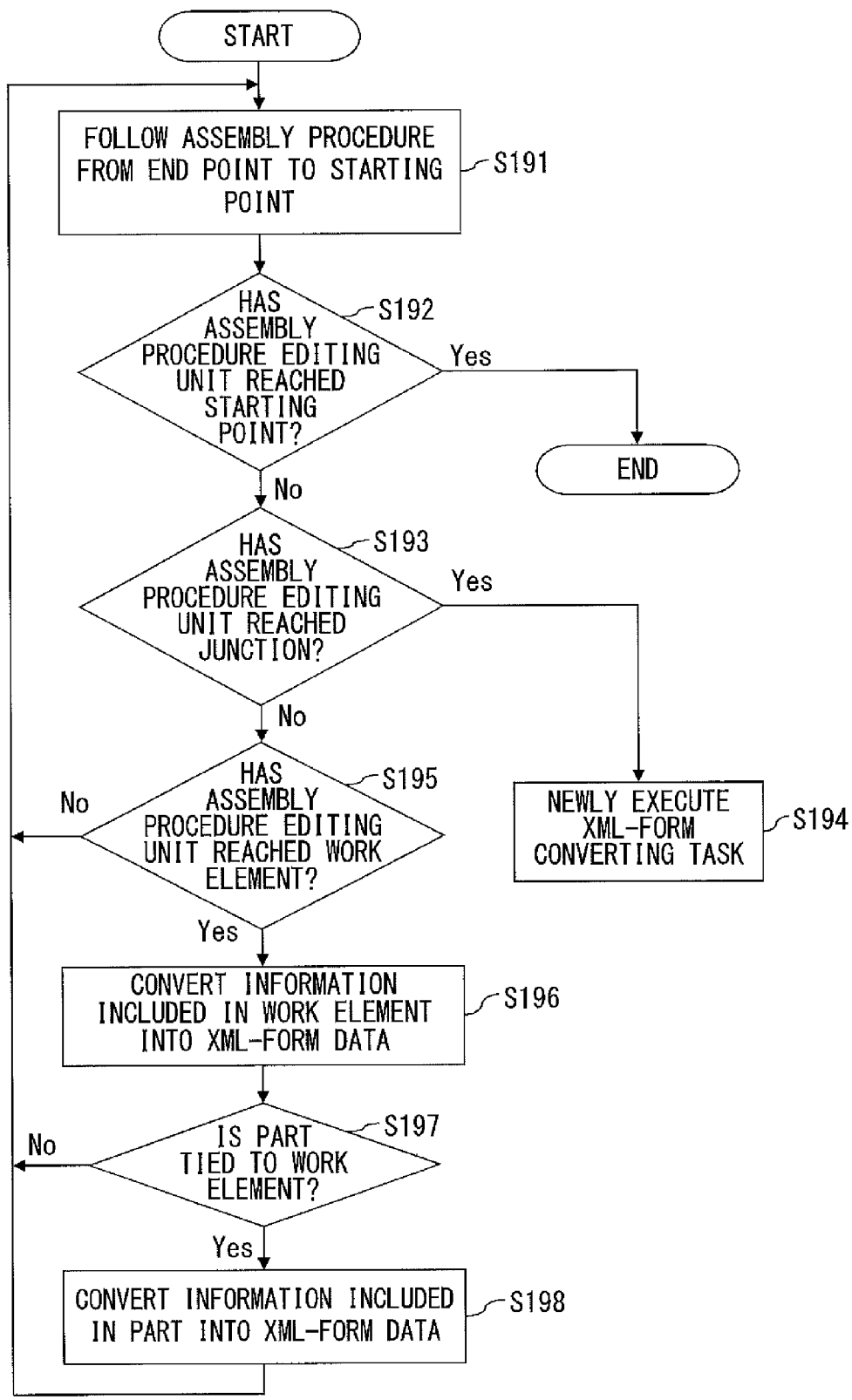
F I G. 19

```
<ASSEMBLY PROCEDURE PRODUCT NAME=" PRODUCT X" >
  <PROCESS ID=" ASM1" , ASSEMBLY WORK NAME=" SCREW TIGHTENING" , DISASSEMBLY WORK ID=" APT1" >
    <TOOL TOOL NAME=" ELECTRIC SCREW DRIVER B" />
  </PROCESS>
</ASSEMBLY PROCEDURE>
```

F I G. 20A

```
<ASSEMBLY PROCEDURE PRODUCT NAME=" PRODUCT X" >
  <PROCESS ID=" ASM1" , ASSEMBLY WORK NAME=" SCREW TIGHTENING" , DISASSEMBLY WORK ID=" APT1" >
    <TOOL TOOL NAME=" ELECTRIC SCREW DRIVER B" />
    <PART ID=" PRT1" , PART NAME=" SCREW" , NUMBER=" 4" />
  </PROCESS>
</ASSEMBLY PROCEDURE>
```

F I G. 20B

| PART NAME | FAULT PHENOMENON | CAUSATIVE PART | CAUSE | REPAIR STATE | REPAIR COST | |
|---|---|---|---|---|---|---|
| | | | | | REUSE AFTER REPAIR | REPLACEMENT |
| PART C | ABNORMAL NOISE | PART D | SCREW LOOSE | FIELD | aaa | aaa |
| PART E | ABNORMAL NOISE | PART B | FAN DAMAGE | CARRY IN | — | — |
| PART C | HEAT GENERATION | PART B | SOLDER FRACTURE | CARRY IN | — | — |
| PART B | BAD SMELL | PART C | OIL DETERIORATION | FIELD | bbb | ccc |
| PART B | BAD SMELL | PART D | BURNING | CARRY IN | — | — |
| UNIT II | — | UNIT II | — | FIELD | ddd | fff |

FIG. 26

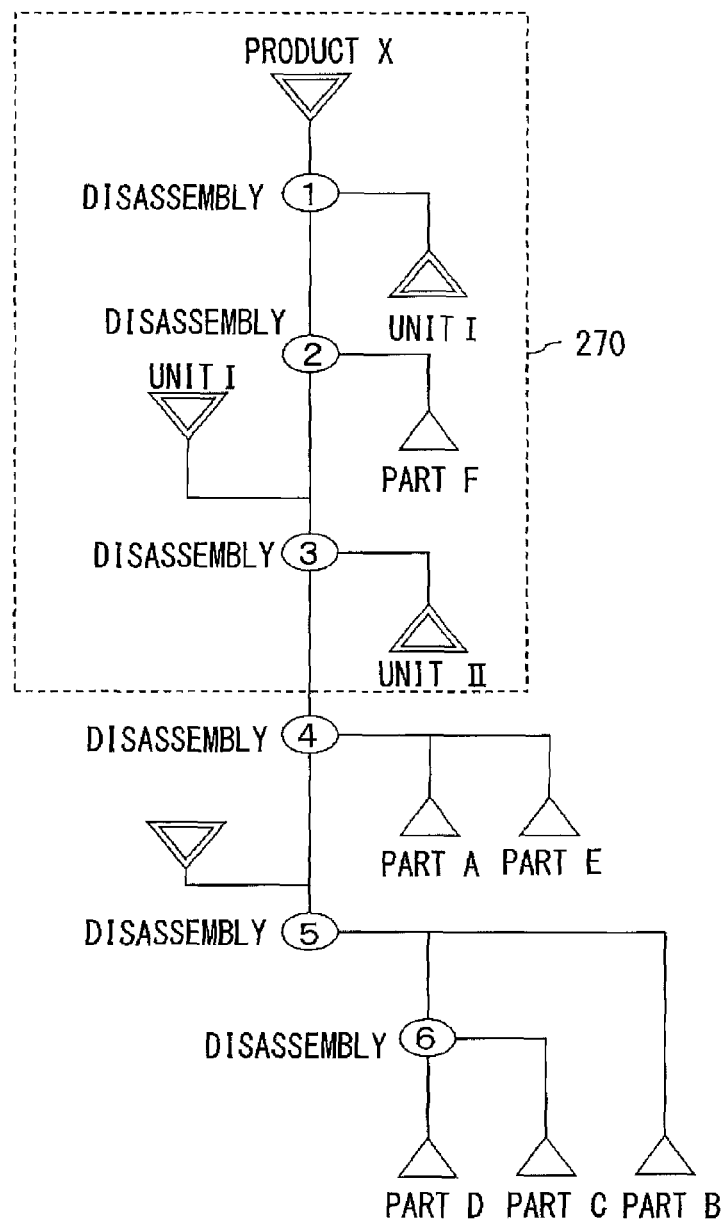
F I G. 2 7

```
331
<DISASSEMBLY PROCEDURE PRODUCT NAME="PRODUCT X">
  <PROCESS ID="APT1", DISASSEMBLY WORK NAME="DISASSEMBLY">
    <TOOL, TOOL NAME="ELECTRIC SCREW DRIVER A"/>
    <FINISHED PRODUCT ID="PRT1", FINISHED PRODUCT NAME="PRODUCT XXX", NUMBER="1"/>
    <PART ID="PRT2", PART NAME="UNIT I", NUMBER="1"/>
  </PROCESS>
  <PROCESS ID="APT1", DISASSEMBLY WORK NAME="DISASSEMBLY">
    <PART ID="PRT3", PART NAME="PART F", NUMBER="1"/>
  </PROCESS>
  <PROCESS ID="APT1", DISASSEMBLY WORK NAME="DISASSEMBLY">
    <TOOL, TOOL NAME="ELECTRIC SCREW DRIVER A"/>
    <FINISHED PRODUCT ID="PRT1", FINISHED PRODUCT NAME="UNIT I", NUMBER="1"/>
    <PART ID="PRT4", PART NAME="UNIT II", NUMBER="1"/>
  </PROCESS>
  <PROCESS ID="APT1", DISASSEMBLY WORK NAME="DISASSEMBLY">
    <TOOL, TOOL NAME="ELECTRIC SCREW DRIVER A"/>
    <PART ID="PRT5", PART NAME="PART A", NUMBER="1"/>
    <PART ID="PRT6", PART NAME="PART E", NUMBER="1"/>
  </PROCESS>
  <PROCESS ID="APT1", DISASSEMBLY WORK NAME="DISASSEMBLY">
    <TOOL, TOOL NAME="ELECTRIC SCREW DRIVER A"/>
    <FINISHED PRODUCT ID="PRT4", FINISHED PRODUCT NAME="UNIT II", NUMBER="1"/>
    <PART ID="PRT7", PART NAME="PART B", NUMBER="1"/>
    <PROCESS ID="APT1", DISASSEMBLY WORK NAME="DISASSEMBLY">
      <TOOL, TOOL NAME="ELECTRIC SCREW DRIVER A"/>
      <PART ID="PRT8", PART NAME="PART C", NUMBER="1"/>
      <PART ID="PRT9", PART NAME="PART D", NUMBER="1"/>
    </PROCESS>
  </PROCESS>
</DISASSEMBLY PROCEDURE>
```

FIG. 33

```
<ASSEMBLY PROCEDURE PRODUCT NAME="PRODUCT X">                                    341
  <PROCESS ID="ASM1", ASSEMBLY WORK NAME="SCREW TIGHTENING",DISASSEMBLY WORK ID="APT1">
    <TOOL, TOOL NAME="ELECTRIC SCREW DRIVER A"/>
    <FINISHED PRODUCT ID="PRT1",FINISHED PRODUCT NAME="PRODUCT XXX", NUMBER="1"/>
    <PART ID="PRT2", PART NAME="UNIT I", NUMBER="1"/>
  </PROCESS>
  <PROCESS ID="ASM3", ASSEMBLY WORK NAME="ADJUSTMENT", DISASSEMBLY WORK ID="APT1">
    <PART ID="PRT3", PART NAME="PART F", NUMBER="1"/>
  </PROCESS>
  <PROCESS ID="ASM1", ASSEMBLY WORK NAME="ASSEMBLY", DISASSEMBLY WORK ID="APT1">
    <TOOL, TOOL NAME="ELECTRIC SCREW DRIVER A"/>
    <FINISHED PRODUCT ID="PRT1", FINISHED PRODUCT NAME="UNIT I", NUMBER="1"/>
    <PART ID="PRT4", PART NAME="UNIT II", NUMBER="1"/>
  </PROCESS>
  <PROCESS ID="ASM1", ASSEMBLY WORK NAME="ASSEMBLY", DISASSEMBLY WORK ID="APT1">
    <TOOL, TOOL NAME="ELECTRIC SCREW DRIVER A"/>
    <PART ID="PRT5", PART NAME="PART A", NUMBER="1"/>
    <PART ID="PRT6", PART NAME="PART E", NUMBER="1"/>
  </PROCESS>
  <PROCESS ID="ASM1", ASSEMBLY WORK NAME="ASSEMBLY", DISASSEMBLY WORK ID="APT1">
    <TOOL, TOOL NAME="ELECTRIC SCREW DRIVER A"/>
    <FINISHED PRODUCT ID="PRT4", FINISHED PRODUCT NAME="UNIT II", NUMBER="1"/>
    <PART ID="PRT7", PART NAME="PART B", NUMBER="1"/>
    <PROCESS ID="ASM1", ASSEMBLY WORK NAME="ASSEMBLY", DISASSEMBLY WORK ID="APT1">
      <TOOL, TOOL NAME="ELECTRIC SCREW DRIVER A"/>
      <PART ID="PRT8", PART NAME="PART C", NUMBER="1"/>
      <PART ID="PRT9", PART NAME="PART D", NUMBER="1"/>
    </PROCESS>
  </PROCESS>
</ASSEMBLY PROCEDURE>
```

F I G. 3 4

```
<REPLACING PROCEDURE PRODUCT NAME="PRODUCT X">
  <PROCESS ID="APT1", DISASSEMBLY WORK NAME="DISASSEMBLY"/>
    <TOOL, TOOL NAME="ELECTRIC SCREW DRIVER A"/>
    <FINISHED PRODUCT ID="PRT1", FINISHED PRODUCT NAME="PRODUCT XXX", NUMBER="1"/>
    <PART ID="PRT2", PART NAME="UNIT I", NUMBER="1"/>
  </PROCESS>
  <PROCESS ID="APT1", DISASSEMBLY WORK NAME="DISASSEMBLY"/>
    <PART ID="PRT3", PART NAME="PART F", NUMBER="1"/>
  </PROCESS>
  <PROCESS ID="APT1", DISASSEMBLY WORK NAME="DISASSEMBLY"/>
    <TOOL, TOOL NAME="ELECTRIC SCREW DRIVER A"/>
    <FINISHED PRODUCT ID="PRT1", FINISHED PRODUCT NAME="UNIT II", NUMBER="1"/>
    <PART ID="PRT4", PART NAME="UNIT II", NUMBER="1"/>
  </PROCESS>                                                              ⎬─331
  <PROCESS ID="ASM1", ASSEMBLY WORK NAME="ASSEMBLY", DISASSEMBLY WORK ID="APT1"/>
    <TOOL, TOOL NAME="ELECTRIC SCREW DRIVER A"/>
    <FINISHED PRODUCT ID="PRT1", FINISHED PRODUCT NAME="UNIT II", NUMBER="1"/>
    <PART ID="PRT4", PART NAME="UNIT II", NUMBER="1"/>
  </PROCESS>
  <PROCESS ID="ASM3", ASSEMBLY WORK NAME="ADJUSTMENT", DISASSEMBLY WORK ID="APT1"/>
    <PART ID="PRT3", PART NAME="PART F", NUMBER="1"/>
  </PROCESS>
  <PROCESS ID="ASM1", ASSEMBLY WORK NAME="SCREW TIGHTENING", DISASSEMBLY WORK ID="APT1"/>
    <TOOL, TOOL NAME="ELECTRIC SCREW DRIVER A"/>
    <FINISHED PRODUCT ID="PRT1", FINISHED PRODUCT NAME="PRODUCT XXX", NUMBER="1"/>
    <PART ID="PRT2", PART NAME="UNIT I", NUMBER="1"/>
  </PROCESS>                                                              ⎬─341
</REPLACING PROCEDURE>
```

F I G. 3 5

DISASSEMBLY PROCEDURE GENERATING METHOD, APPARATUS, AND SYSTEM, AND REPLACEMENT PROCEDURE GENERATING METHOD, APPARATUS, AND SYSTEM

CROSS-REFERENCE TO RELATED APPLICATION

This application claims benefit of Japanese Application No. 2013-025137 filed Feb. 13, 2013, the contents of which are incorporated by this reference.

This application is a continuation of PCT application PCT/JP2014/050282, which was filed on Jan. 10, 2014.

FIELD

The present invention relates to generation of a procedure for disassembling a product and a procedure for replacing a part constituting a product.

BACKGROUND

There is a great need to increase the efficiency of a task of preparing a repair manual by using a disassembly or replacement procedure. Service manuals are required to be highly usable for service technicians who make repairs.

As an efficient method of creating a disassembly procedure, Japanese Laid-open Patent Publication No. 2007-7740 discloses a technology for converting an assembly procedure into a disassembly procedure by referring to a database storing work elements of the assembly procedure and work elements of the disassembly procedure in relation to each other.

As a method of creating an efficient replacement procedure, Japanese Laid-open Patent Publication No. 2010-182083 discloses a technology wherein a database associating an error code indicating details of a fault in a product, a part constituting the product, and a work element of a replacement procedure with each other is referred to so as to search for the replacement procedure and a part to be replaced corresponding to the error code.

SUMMARY

A disassembly procedure generating method of the present invention is used by a computer that includes a recording unit and a displaying unit, and is a disassembly procedure generating method for generating a disassembly procedure associated with a product assembly procedure, the method including the steps of: inserting a new work element into the assembly procedure in accordance with an input instruction; performing monitoring as to whether a new work element has been inserted into the assembly procedure; when a new work element is inserted into the assembly procedure, generating a disassembly procedure by using work elements of the assembly procedure into which the new work element has been inserted and by using information associating work elements of the assembly procedure with work elements of the disassembly procedure and that is recorded in advance in the recording unit; calculating a cost generated for the entirety of the disassembly procedure by calculating the total sum of costs generated for individual work elements of the disassembly procedure; and causing the displaying unit to display, together with the assembly procedure, the disassembly procedure and the cost generated for the entirety of the disassembly procedure.

A replacement procedure generating method of the invention is used by a computer that includes a storage unit and a displaying unit, and is a replacement procedure generating method for generating a procedure for replacing a part constituting a product, the method including the steps of: inserting a new work element into the assembly procedure in accordance with an input instruction; performing monitoring as to whether a new work element has been inserted into the assembly procedure; when a new work element is inserted into the assembly procedure, generating a disassembly procedure by using work elements of the assembly procedure into which the new work element has been inserted and by using information associating work elements of the assembly procedure with work elements of the disassembly procedure and that is recorded in advance in the recording unit; identifying a faulty part corresponding to an input fault phenomenon occurrence position according to an input fault phenomenon, and identifying a replacement part corresponding to the identified faulty part by referring to information associating the faulty part with the replacement part and that is recorded in advance in the recording unit; generating the replacement procedure according to the assembly procedure, the disassembly procedure, and the replacement part; calculating a cost generated for the entirety of the replacement procedure; and causing the displaying unit to display, together with the assembly procedure, the replacement procedure and the cost generated for the entirety of the replacement procedure.

BRIEF DESCRIPTION OF DRAWINGS

FIG. 3 is a flowchart illustrating operations of a disassembly procedure generating apparatus or a disassembly procedure generating system;

FIG. 4 illustrates an example of information associating "WORK ID", "WORK ELEMENT", "HANDLING OF PART", and "WORK COST" with each other;

FIG. 5 illustrates an exemplary assembly procedure in an XML form;

FIG. 6 illustrates an exemplary disassembly procedure in an XML form;

FIG. 7 illustrates two-dimensional coordinates corresponding to a display screen for an assembly procedure, and two-dimensional coordinates corresponding to a display screen for a disassembly procedure;

FIG. 8 illustrates an example of information associating "ASSEMBLY TOOL", "LOCATION ID", and "DISASSEMBLY TOOL" with each other;

FIG. 9 illustrates an exemplary disassembly procedure in an XML form;

FIG. 15 illustrates an exemplary assembly procedure in an XML form;

FIG. 18 illustrates an exemplary assembly procedure in an XML form;

FIG. 19 is a flowchart illustrating operations performed by an assembly procedure editing unit in the converting of an assembly procedure in a tree form into an assembly procedure in an XML form;

FIG. 20A illustrates an exemplary assembly procedure in an XML form;

FIG. 20B illustrates an exemplary assembly procedure in an XML form;

FIG. 26 illustrates an example of information associating "PART NAME", "FAULT PHENOMENON", "CAUSATIVE PART", "CAUSE", "REPAIR STATE", and "REPAIR COST" with each other;

FIG. 27 illustrates an exemplary disassembly procedure in a tree form;

FIG. 33 illustrates an exemplary disassembly procedure in an XML form;

FIG. 34 illustrates an exemplary assembly procedure in an XML form; and

FIG. 35 illustrates an exemplary replacement procedure in an XML form.

DETAILED DESCRIPTION OF PREFERRED EMBODIMENTS

Figure 1:
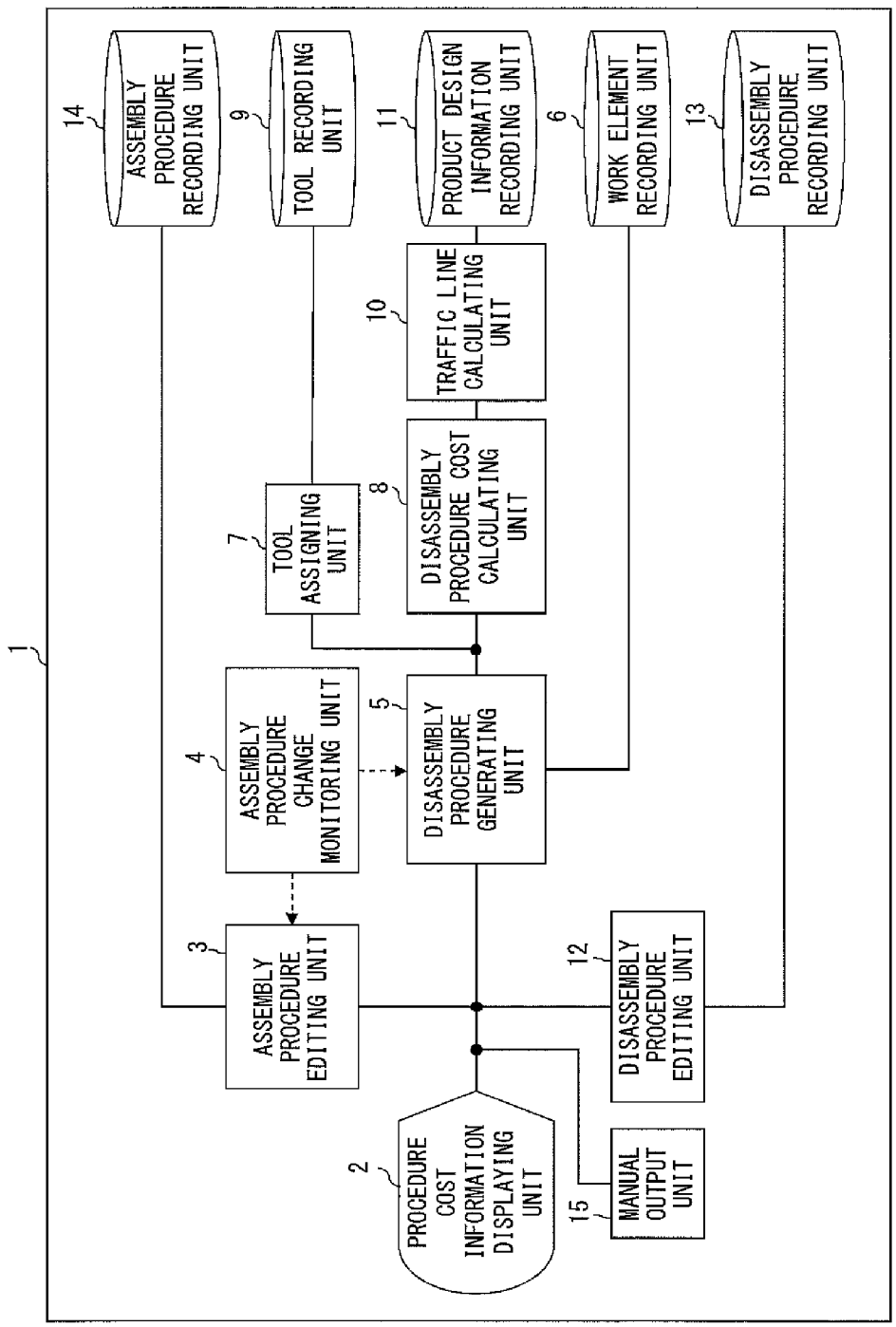
FIG. 1 illustrates a disassembly procedure generating apparatus in accordance with an embodiment.

FIG. 1 illustrates a disassembly procedure generating apparatus in accordance with an embodiment.

A disassembly procedure generating apparatus 1 depicted in FIG. 1 includes a procedure cost information displaying unit 2 (displaying unit), an assembly procedure editing unit 3, an assembly procedure change monitoring unit 4, a disassembly procedure generating unit 5, a work element recording unit 6, a tool assigning unit 7, a disassembly procedure cost calculating unit 8, a tool recording unit 9, a traffic line calculating unit 10, a product design information recording unit 11, a disassembly procedure editing unit 12, a disassembly procedure recording unit 13, an assembly procedure recording unit 14, and a manual output unit 15. One recording unit may configure the work element recording unit 6, the tool recording unit 9, the product design information recording unit 11, the disassembly procedure recording unit 13, and the assembly procedure recording unit 14.

The assembly procedure editing unit 3 edits an assembly procedure for a product through an interactive process with a user (e.g., a creator of a repair manual) performed via the procedure cost information displaying unit 2.

The assembly procedure change monitoring unit 4 performs monitoring as to whether the assembly procedure editing unit 3 has made a change in an assembly procedure. When a change is made to the assembly procedure, the assembly procedure change monitoring unit 4 instructs the disassembly procedure generating unit 5 to generate a disassembly procedure.

The disassembly procedure generating units generates a disassembly procedure using work elements of the assembly procedure edited by the assembly procedure editing unit 3 and information associating work elements of the assembly procedure and disassembly procedure recorded by the work element recording unit 6 with each other. The disassembly procedure generating unit 5 instructs the tool assigning unit 7 to assign tools for the generated disassembly procedure, and instructs the disassembly procedure cost calculating unit 8 to calculate costs generated for the entirety of the generated disassembly procedure.

For each work element of the disassembly procedure, the tool assigning unit 7 assigns a tool corresponding to a repair location in accordance with information indicating tools recorded by the tool recording unit 9.

The disassembly procedure cost calculating unit 8 calculates a cost generated for the entirety of the disassembly procedure using a traffic line length calculated by the traffic line calculating unit 10 and information indicating a work cost generated for each work element of the disassembly procedure recorded by the work element recording unit 6.

Using the disassembly procedure generated by the disassembly procedure generating unit 5 and conclusion position information recorded by the product design information recording unit 11 for each part constituting the product, the traffic line calculating unit 10 calculates the length of a traffic line linking conclusion positions of the parts.

The disassembly procedure generated by the disassembly procedure generating unit 5 and the cost generated for the entirety of the disassembly procedure and calculated by the disassembly procedure cost calculating unit 8 are displayed on the display screen of the procedure cost information displaying unit 2 together with the assembly procedure. In this case, when the user determines that the disassembly procedure needs to be modified after, for example, checking the cost to be generated for the entirety of the disassembly procedure, the disassembly procedure editing unit 12 edits the disassembly procedure through an interactive process with the user performed via the procedure cost information displaying unit 2, and records the edited disassembly procedure in the disassembly procedure recording unit 13. The manual output unit 15 outputs a repair manual that includes the assembly procedure, the disassembly procedure, and the cost generated for the entirety of the disassembly procedure in a manner such that service technicians who make repairs can browse the manual.

Figure 2:
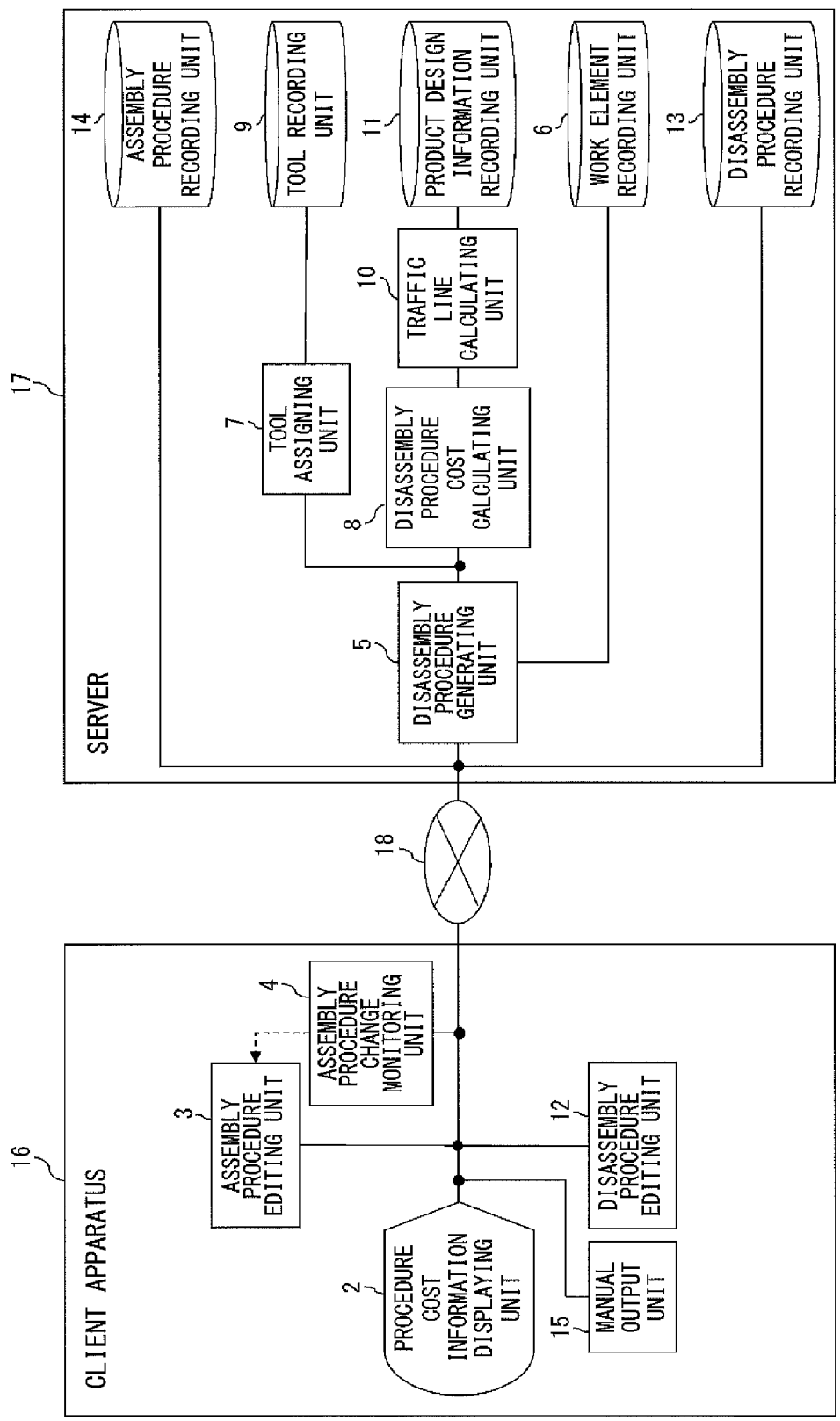
FIG. 2 illustrates a disassembly procedure generating system in accordance with an embodiment.

FIG. 2 illustrates a disassembly procedure generating system in accordance with an embodiment. In FIG. 2, like components are given like numerals used in FIG. 1, and descriptions thereof are omitted herein.

The disassembly procedure generating system depicted in FIG. 2 includes a client apparatus 16 and a server 17. The client apparatus 16 and the server 17 transmit data to and receive data from each other over a network 18, e.g., the Internet or a wireless LAN. The work element recording unit 6, the tool recording unit 9, the product design information recording unit 11, the disassembly procedure recording unit 13, and the assembly procedure recording unit 14 may be configured by one recording unit, or may be installed in another client apparatus or another server over the network 18.

The client apparatus 16 includes the procedure cost information displaying unit 2, the assembly procedure editing unit 3, the assembly procedure change monitoring unit 4, the disassembly procedure editing unit 12, and the manual output unit 15.

The server 17 includes the disassembly procedure generating unit 5, the work element recording unit 6, the tool assigning unit 7, the disassembly procedure cost calculating unit 8, the tool recording unit 9, the traffic line calculating unit 10, the product design information recording unit 11, the disassembly procedure recording unit 13, and the assembly procedure recording unit 14.

When information indicating that a new work element has been incorporated into an assembly procedure is transmitted from the client apparatus 16 to the server 17, the disassembly procedure generating unit 5 generates a disassembly procedure.

The procedure cost information displaying unit 2 displays, together with the assembly procedure, the disassembly procedure and a cost generated for the entirety of the disassembly procedure, i.e., the disassembly procedure and cost transmitted from the server 17 to the client apparatus 16.

FIG. 3 is a flowchart illustrating operations of the disassembly procedure generating apparatus 1 depicted in FIG. 1 or the disassembly procedure generating system depicted in FIG. 2.

When the assembly procedure change monitoring unit 4 determines that an assembly procedure has been changed (Yes in S31), the assembly procedure change monitoring unit 4 transmits information to that effect to the disassembly procedure generating unit 5. In one possible example, the assembly procedure change monitoring unit 4 always monitors an XML-form assembly procedure generated by the assembly procedure editing unit 3, and determines that the assembly procedure has been changed when a change is made to the XML-form assembly procedure at a certain point in time.

Upon receipt of information indicating that the assembly procedure has been changed, the disassembly procedure generating unit 5 creates a disassembly procedure (S32). In one possible example, the disassembly procedure generating unit 5 refers to information associating "WORK ID", "WORK ELEMENT", "HANDLING OF PART", and "WORK COST" with each other as depicted in FIG. 4 (information recorded by the work element recording unit 6), determines that a work element of the disassembly procedure corresponding to work ID="APT1" at a second line from the top of the XML-form assembly procedure depicted in FIG. 5 corresponds to "SCREW REMOVAL", and sets, to "SCREW REMOVAL", the "WORK ID" at the second line from the top of XML-form data in the disassembly procedure depicted in FIG. 6. That is, by referring to information associating work IDs of the disassembly procedure and work elements of the disassembly procedure with each other, the disassembly procedure generating unit 5 converts a work ID corresponding to the work element "SCREW TIGHTENING" of the assembly procedure into the work element "SCREW REMOVAL" of the disassembly procedure. By referring to information depicted in FIG. 4, the disassembly procedure generating unit 5 determines that a work element of the disassembly procedure corresponding to work ID="APT0" at the eleventh line from the top of the XML-form assembly procedure depicted in FIG. 5 corresponds to "N/A". That is, the disassembly procedure generating unit 5 does not generate a work element of the disassembly procedure corresponding to a work element "ADHESION" of the assembly procedure. The "HANDLING OF PART" corresponding to "APT0" is "UNITIZE COMPONENTS", as depicted in FIG. 4. Accordingly, pieces of data at the eleventh to fifteenth lines from the top of the XML-form assembly procedure depicted in FIG. 5 (pieces of data within a dashed-line frame) are grouped together and converted into pieces of data at the tenth to thirteenth lines from the top of the XML-form disassembly procedure depicted in FIG. 6 (pieces of data within a dashed-line frame). Meanwhile, the disassembly procedure generating unit 5 determines a work order for work elements of a tree-form disassembly procedure using position information of work elements of a tree-form assembly procedure. In one possible example, a two-dimensional coordinate system corresponding to a display screen provided for the assembly procedure by the procedure cost information displaying unit 2, and a two-dimensional coordinate system corresponding to a display screen provided for the disassembly procedure by the procedure cost information displaying unit 2 are defined as illustrated in FIG. 7. A coordinate position (w1, h1) of "SCREW TIGHTENING (1)" of the assembly procedure is converted into a coordinate position (w2, h2) of "SCREW REMOVAL (1)" of the disassembly procedure, and this position is defined as the position of a work element of the disassembly procedure displayed on the display screen of the procedure cost information displaying unit 2. In advance, for the assembly procedure, coordinate conversion may start with a work element with a lowest Y-coordinate value, and, for the disassembly procedure, coordinate conversion may start with a work element with a highest Y-coordinate value, so as to determine a work order of the disassembly procedure.

Referring to FIG. 3, the tool assigning unit 7 assigns a tool to be used at a repair location to each work element of the disassembly procedure generated by the disassembly procedure generating unit 5 (S33). In one possible example, by referring to information associating "ASSEMBLY TOOL", "LOCATION ID", and "DISASSEMBLY TOOL" with each other as depicted in FIG. 8, the tool assigning unit 7 determines that a tool for the disassembly procedure corresponding to tool name="ELECTRIC SCREW DRIVER B" at the third line from the top of the XML-form assembly procedure depicted in FIG. 5 corresponds to "CROSS-RECESSED DRIVER S1B" for "SITE1", "ELECTRIC SCREW DRIVER S2B" for "SITE2 ", and "CROSS-RECESSED DRIVER S3 B" for "SITES", sets a tool corresponding to location ID="SITE1" at the third line from the top of the XML-form disassembly procedure to tool name="CROSS-RECESSED DRIVER S1B", sets a tool corresponding to location ID="SITE2" at the fourth line from the top to tool name="ELECTRIC SCREW. DRIVER S2B", and sets a tool corresponding to location ID="SITE3" at the fifth line from the top to tool name="CROSS-RECESSED DRIVER S3B", as depicted in FIG. 9.

Figure 10:
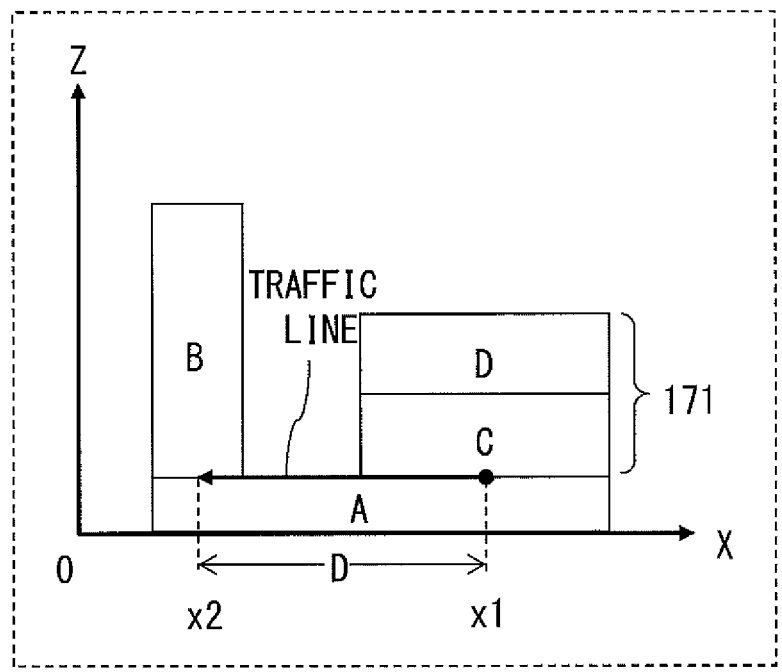
FIG. 10 illustrates an exemplary traffic line in a disassembly procedure.

Referring to FIG. 3, the traffic line calculating unit 10 calculates the lengths of traffic lines linking conclusion positions between all parts indicated for a disassembly procedure by the disassembly procedure for which tools are assigned in S33 and conclusion positions of parts recorded in advance in the product design information recording unit 11 (S34). When, for example, a part B is removed from a part A after a unit part 171 consisting of parts C and D is removed from the part A as depicted in FIG. 10, the traffic line calculating unit 10 calculates a distance D from a conclusion position x1 between the unit part 171 and the part A to a conclusion position x2 between the parts B and A, and defines the calculated distance D as the length of a traffic.

Referring to FIG. 3, the disassembly procedure cost calculating unit 8 multiplies the length of the traffic calculated in S34 by a work cost per unit length of the traffic line recorded in advance in the product design information recording unit 11, in order to calculate a work cost C11 corresponding to the lengths of traffic lines linking the conclusion positions of all parts indicated for the disassembly procedure. The disassembly procedure cost calculating unit 8 also calculates a work cost C12, i.e., the sum of work costs generated for individual work elements of the disassembly procedure, and defines a sum of the work costs C11 and C12 as a cost generated for the entirety of the disassembly procedure (S35). In one possible example, by referring to information depicted in FIG. 4, the disassembly procedure cost calculating unit 8 determines work costs corresponding to individual work elements of the disassembly procedure and defines the sum thereof as the work cost C12.

Figure 11:
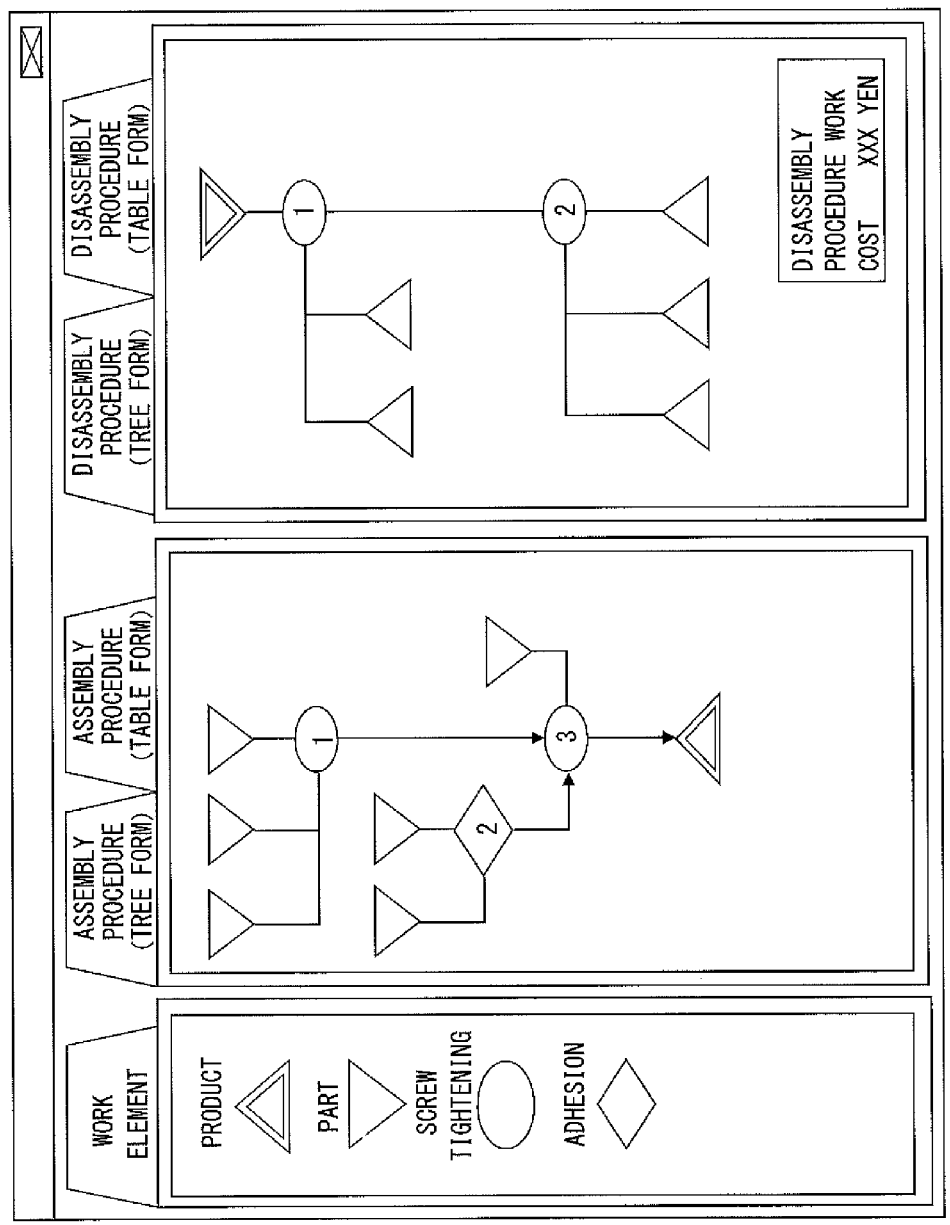
FIG. 11 illustrates an exemplary display screen of a procedure cost information displaying unit.
Figure 12:
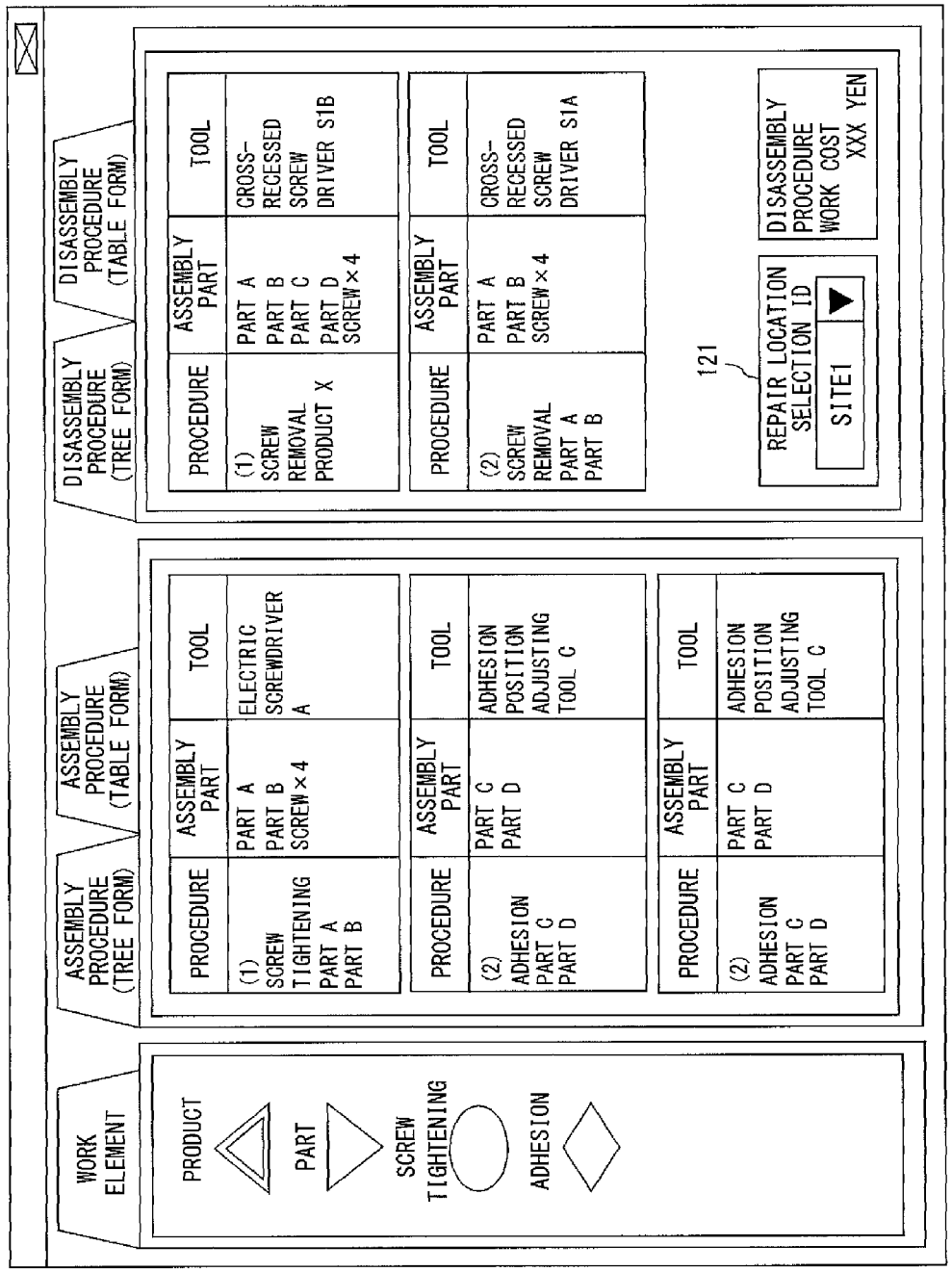
FIG. 12 illustrates an exemplary display screen of a procedure cost information displaying unit.

The procedure cost information displaying unit 2 displays, together with the assembly procedure, the disassembly procedure and the cost generated for the entirety of the disassembly procedure (S36). In one possible example, the procedure cost information displaying unit 2 displays, as depicted in FIG. 11, a tree-form disassembly procedure and a cost generated for the entirety of the disassembly procedure next to a tree-form assembly procedure, or displays, as depicted in FIG. 12, a table-form disassembly procedure and a cost generated for the entirety of the disassembly procedure next to a table-form assembly procedure. In the example depicted in FIG. 12, a repair location ID is selectable in a dropdown menu provided within a repair location selection area 121 so that tools for the disassembly procedure can be displayed in accordance with the selected repair location ID.

Figure 13:
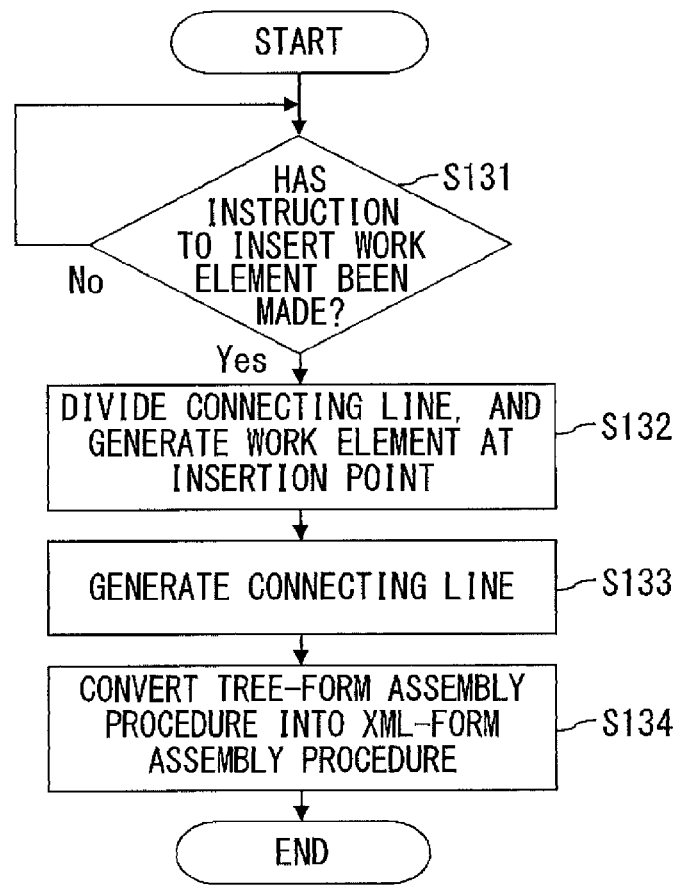
FIG. 13 is a flowchart illustrating operations performed by an assembly procedure editing unit in the inserting of a work element into an assembly procedure.

FIG. 13 is a flowchart illustrating exemplary operations performed by the assembly procedure editing unit 3 in the inserting of a new work element into an assembly procedure.

In an interactive process with a user performed via the procedure cost information displaying unit 2, when the assembly procedure editing unit 3 receives an instruction to incorporate a new work element into an assembly procedure already generated (Yes in S131), the assembly procedure editing unit 3 divides a connecting line linking work elements at the insertion point and generates, at the insertion point, the work element designated by the user (S132).

The assembly procedure editing unit 3 generates a connecting line for linking the work element newly generated in S132 and another work element (S133), and converts (serializes) a tree-form assembly procedure into data in an XML form (S134).

Figure 14A:
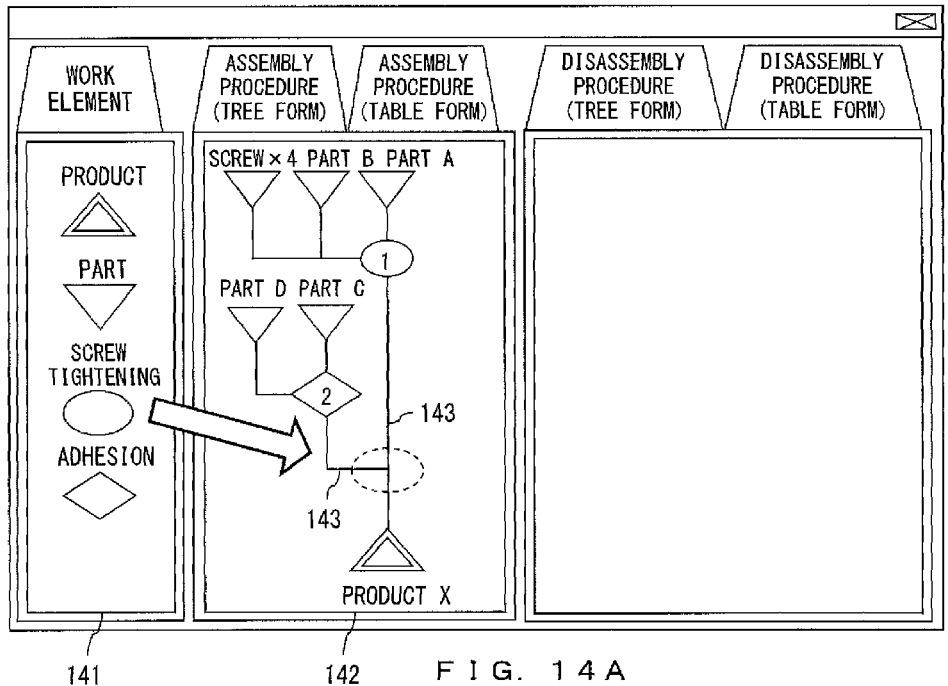
FIG. 14A illustrates an exemplary display screen of a procedure cost information displaying unit.
Figure 14B:
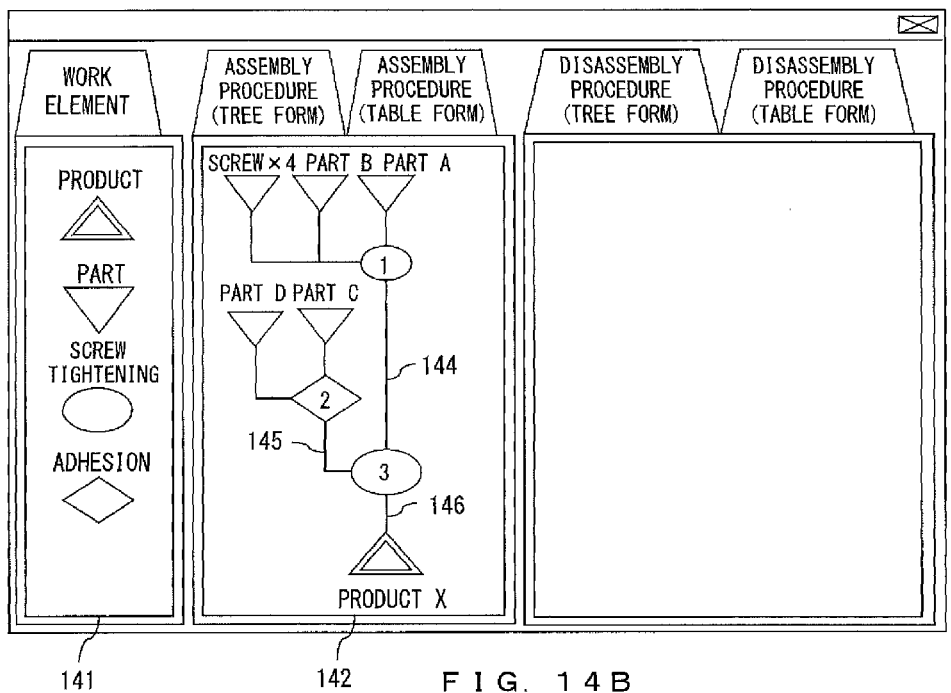
FIG. 14B illustrates an exemplary display screen of a procedure cost information displaying unit.

In one possible example, as illustrated in the exemplary display screen of the procedure cost information displaying unit 2 depicted in FIG. 14A, using a pointing device, the user drags the icon "SCREW TIGHTENING" within a display field 141 and then drops that icon at a position within a display field 142 and between "PRODUCT X" and a point at which "SCREW TIGHTENING (1)" and "ADHESION (2)" are connected, wherein icons indicating a part, a work element, and so on are displayed in the display field 141, and a tree-form assembly procedure is displayed in the display field 142. Accordingly, after dividing the connecting line 143, as illustrated in the exemplary display screen of the procedure cost information displaying unit 2 depicted in FIG. 14B, the assembly procedure editing unit 3 generates "SCREW TIGHTENING (3)" designated by the user at a position at which the icon is dropped, and generates a connecting line 144 linking "SCREW TIGHTENING (1)" and "SCREW TIGHTENING (3)", a connecting line 145 linking "ADHESION (2)" and "SCREW TIGHTENING (3)", and a connecting line 146 linking "SCREW TIGHTENING (3)" and "PRODUCT X". Then, the assembly procedure editing unit 3 converts the tree-form assembly procedure within the display field 142 depicted in FIG. 14B into an XML-form assembly procedure as depicted in FIG. 15. Note that data at second to third lines of the XML-form assembly procedure depicted in FIG. 15 corresponds to "SCREW TIGHTENING (3)", i.e., the newly inserted work element.

Figure 16:
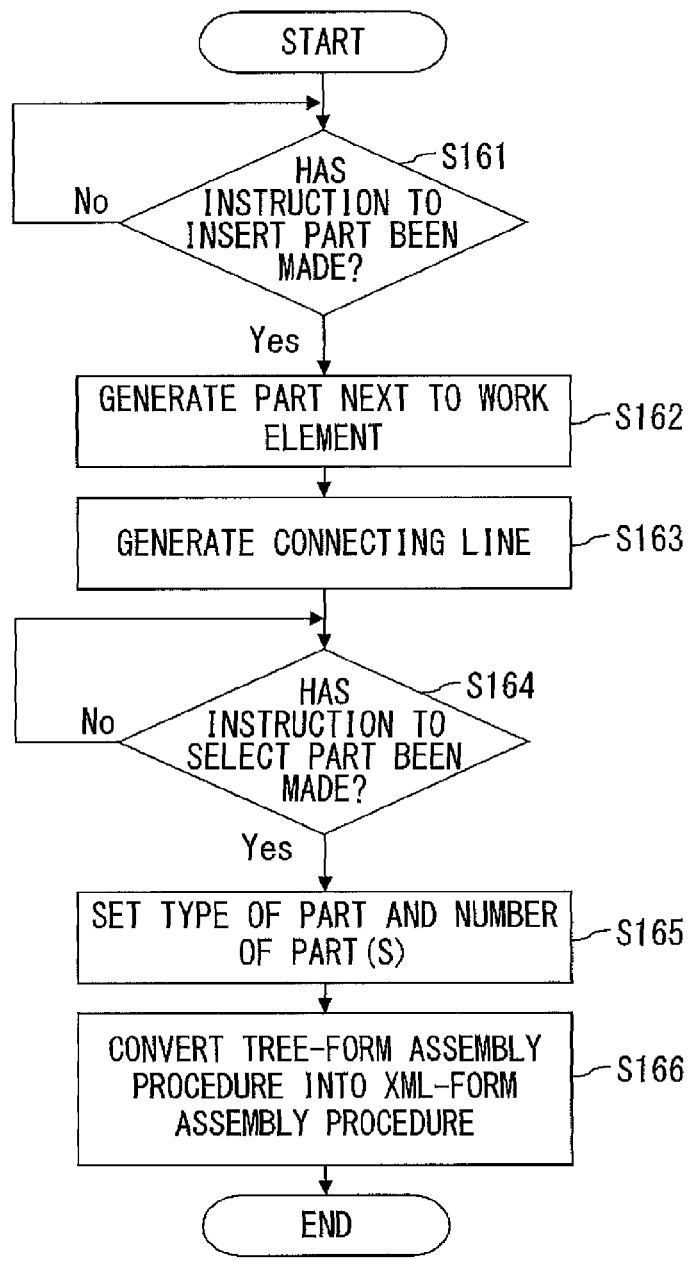
FIG. 16 is a flowchart illustrating operations performed by an assembly procedure editing unit in the inserting of a part into an assembly procedure.

FIG. 16 is a flowchart illustrating exemplary operations performed by the assembly procedure editing unit 3 in the inserting of a part into an assembly procedure.

In an interactive process with a user performed via the procedure cost information displaying unit 2, when the assembly procedure editing unit 3 receives an instruction to incorporate a new part into a work element of an assembly procedure (Yes in S161), the assembly procedure editing unit 3 generates the part designated by the user at a position next to the work element and at which a connecting line is not present (S162), and generates a connecting line for linking that part and that work element (S163).

In an interactive process with a user performed via the procedure cost information displaying unit 2, when the assembly procedure editing unit 3 receives an instruction to select the type of a part after insertion and the number of part(s) (Yes in S164), the assembly procedure editing unit 3 sets the type and the number in accordance with the selection instruction (S165). In one possible example, when the user double-clicks "PART" using a pointing device, the assembly procedure editing unit 3 causes a dialog box for input of the type of a part and the number of part(s) to be displayed, and sets the type and number of parts input to the dialog box.

The assembly procedure editing unit 3 converts (serializes) a tree-form assembly procedure into an XML-form assembly procedure (S166).

Figure 17A:
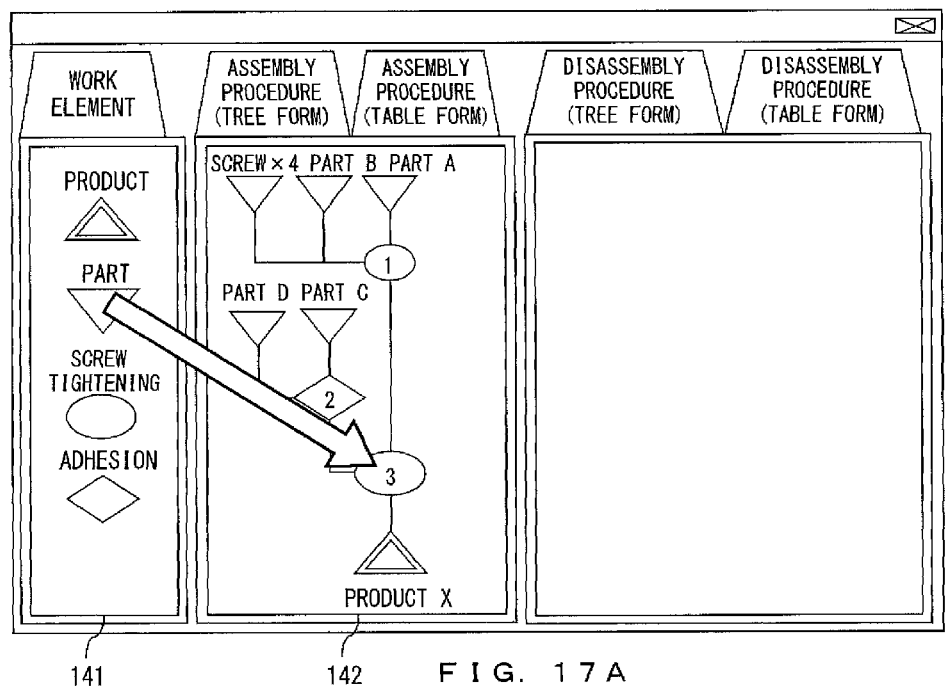
FIG. 17A illustrates an exemplary display screen of a procedure cost information displaying unit.
Figure 17B:
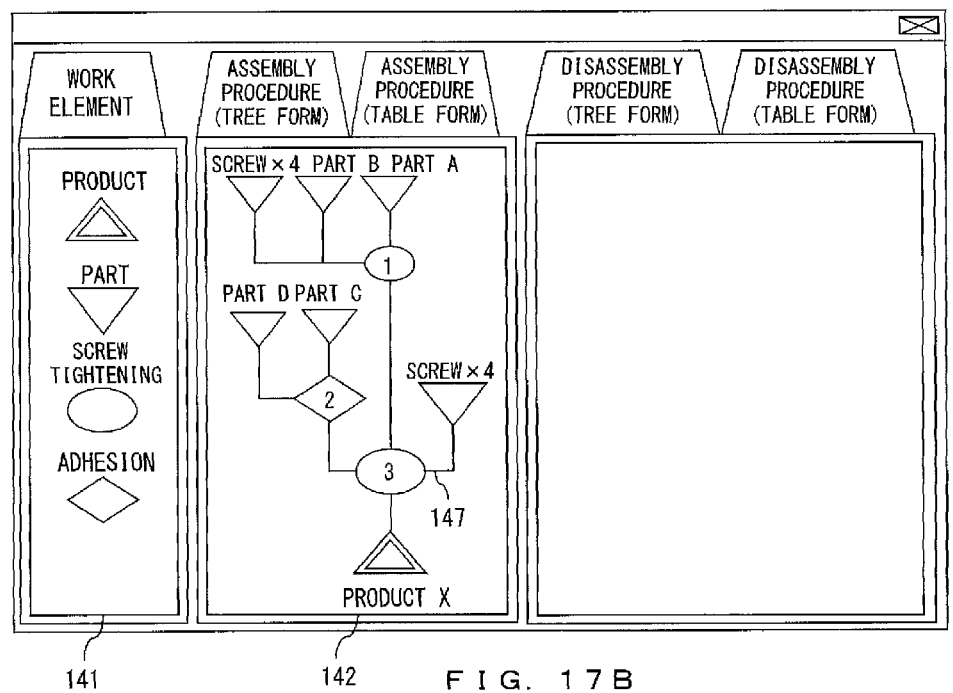
FIG. 17B illustrates an exemplary display screen of a procedure cost information displaying unit.

In one possible example, as illustrated in the exemplary display screen of the procedure cost information displaying unit 2 depicted in FIG. 17A, using a pointing device, the user drags the icon "PART" within a display field 141 and then drops that icon onto "SCREW TIGHTENING (3)" within a display field 142, wherein icons indicating a part, a work element, and so on are displayed in the display field 141, and a tree-form assembly procedure is displayed in the display field 142. Accordingly, as illustrated in the exemplary display screen of the procedure cost information displaying unit 2 depicted in FIG. 17B, the assembly procedure editing unit 3 generates "SCREW×4" at a position next to "SCREW TIGHTENING (3)" and at which a connecting line is not present, and generates a connecting line 147 linking "SCREW TIGHTENING (3)" and "SCREW×4". Then, the assembly procedure editing unit 3 converts the tree-form assembly procedure within the display field 142 depicted in FIG. 17B into an XML-form assembly procedure as depicted in FIG. 18. Note that data at a fourth line from the top of the XML-form data depicted in FIG. 18 corresponds to "SCREW×4", i.e., a newly inserted element.

FIG. 19 is a flowchart illustrating operations performed by the assembly procedure editing unit 3 in the converting of an assembly procedure in a tree form into an assembly procedure in an XML form.

The assembly procedure editing unit 3 follows a tree-form assembly procedure from an end point thereof ("PRODUCT" at the bottom end) to a starting point (work element at the upper end) (S191). When the starting point is reached (Yes in S192), the assembly procedure editing unit 3 ends a task of converting the tree-form assembly procedure into an XML-form assembly procedure. When a junction is reached (work element linked to more than one work element) (Yes in S193), the assembly procedure editing unit 3 newly executes the flowchart illustrated in FIG. 19 for a route that is different from the route in the process of the converting task (S194).

When a work element is reached (Yes in S195), the assembly procedure editing unit 3 converts information included in the work element into XML-form data (S196). In, for example, the tree-form assembly procedure depicted in FIG. 14B, when the assembly procedure editing unit 3 leaves "PRODUCT X", i.e., an end point, and then reaches "SCREW TIGHTENING (3)", i.e., a junction and work element, the assembly procedure editing unit 3 generates XML-form data as illustrated in FIG. 20A.

Referring to FIG. 19, when a part is tied to the work element (Yes in S197), the assembly procedure editing unit 3 converts information included in the part into XML-form data (S198) and returns to S191. When, for example, a part "SCREW×4" is tied to "SCREW TIGHTENING (3)" in the tree-form assembly procedure depicted in FIG. 17B, the assembly procedure editing unit 3 generates XML-form data as depicted in FIG. 20B.

As described above, the disassembly procedure generating apparatus 1 depicted in FIG. 1 or the disassembly procedure generating system depicted in FIG. 2 displays, together with an assembly procedure, a disassembly procedure and a cost generated for the entirety of the disassembly procedure on the display screen of the procedure cost information displaying unit 2, so that the user can evaluate and/or edit a disassembly procedure according to the cost in parallel with generation of an assembly procedure, thereby creating a repair manual that allows a service technology to become highly usable. That is, the disassembly procedure generating apparatus 1 depicted in FIG. 1 or the disassembly procedure generating system depicted in FIG. 2 can efficiently generate a disassembly procedure for which usability for service technicians is considered.

The disassembly procedure generating apparatus 1 depicted in FIG. 1 or the disassembly procedure generating system depicted in FIG. 2 displays, together with a disassembly procedure, tools used for individual work elements of the disassembly procedure on the display screen of the procedure cost information displaying unit 2, thereby creating a repair manual that allows the service technology to become more usable.

Figure 21:
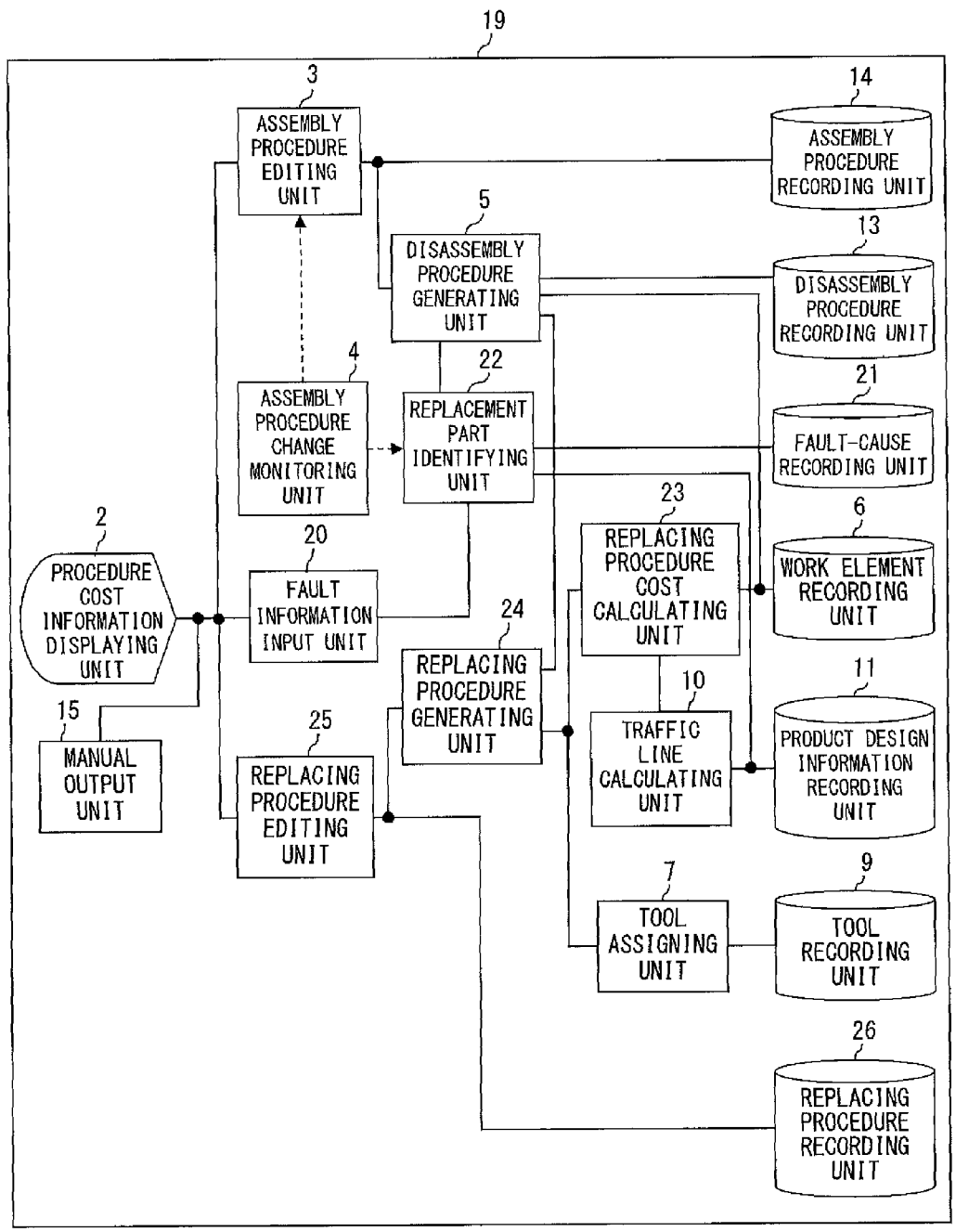
FIG. 21 illustrates a replacement procedure generating apparatus in accordance with an embodiment.

FIG. 21 illustrates a replacement procedure generating apparatus in accordance with an embodiment. In FIG. 21, like components are given like numerals used in FIG. 1, and descriptions thereof are omitted herein.

A replacement procedure generating apparatus 19 depicted in FIG. 21 includes the procedure cost information displaying unit 2 (displaying unit), the assembly procedure editing unit 3, the assembly procedure change monitoring unit 4, the disassembly procedure generating unit 5, the work element recording unit 6, the tool assigning unit 7, the tool recording unit 9, the traffic line calculating unit 10, the product design information recording unit 11, the disassembly procedure recording unit 13, the assembly procedure recording unit 14, the manual output unit 15, a fault information input unit 20, a fault-cause recording unit 21, a replacement part identifying unit 22, a replacement procedure cost calculating unit 23, a replacement procedure generating unit 24, a replacement procedure editing unit 25, and a replacement procedure recording unit 26. The work element recording unit 6, the tool recording unit 9, the product design information recording unit 11, the disassembly procedure recording unit 13, the assembly procedure recording unit 14, the fault-cause recording unit 21, and the replacement procedure recording unit 26 may be configured by one recording unit.

The disassembly procedure generating unit 5 not only generates a disassembly procedure but also instructs the replacement part identifying unit 22 to identify a replacement part.

The replacement part identifying unit 22 identifies a replacement part according to fault information (information indicating, for example, a faulty part position, a fault phenomenon, and a repair level) input by the fault information input unit 20, conclusion position information of a target part recorded by the product design information recording unit 11, and fault-cause information (information indicating a part that is a cause of a fault) recorded by the fault-cause recording unit 21.

According to an assembly procedure, a disassembly procedure, and a replacement part, the replacement procedure generating unit 24 generates a replacement procedure for reassembling a product after removing a replacement part from the product, and instructs the replacement procedure cost calculating unit 23 to calculate a cost generated for the entirety of the replacement procedure.

The replacement procedure cost calculating unit 23 calculates a cost generated for the entirety of the replacement procedure according to a traffic line length calculated by the traffic line calculating unit 10, information indicating a work cost generated for each work element of the disassembly procedure recorded by the work element recording unit 6, and a repair cost corresponding to an input repair level.

According to a disassembly procedure generated by the disassembly procedure generating unit 5 and conclusion position information recorded by the product design information recording unit 11 for each of a plurality of parts constituting a product, the traffic line calculating unit 10 calculates the lengths of traffic lines linking conclusion positions of the parts.

The replacement procedure generated by the replacement procedure generating unit 24 and the cost generated for the entirety of the replacement procedure and calculated by the replacement procedure cost calculating unit 23 are displayed on the display screen of the procedure cost information displaying unit 2 together with the assembly procedure. In this case, when the user determines that the replacement procedure needs to be modified after, for example, checking the cost generated for the entirety of the replacement procedure, the replacement procedure is edited and recorded in the replacement procedure recording unit 26. The manual output unit 15 outputs a repair manual that includes the assembly procedure, the replacement procedure, and the cost generated for the entirety of the replacement procedure in a manner such that service technicians who make repairs can browse the manual.

Figure 22:
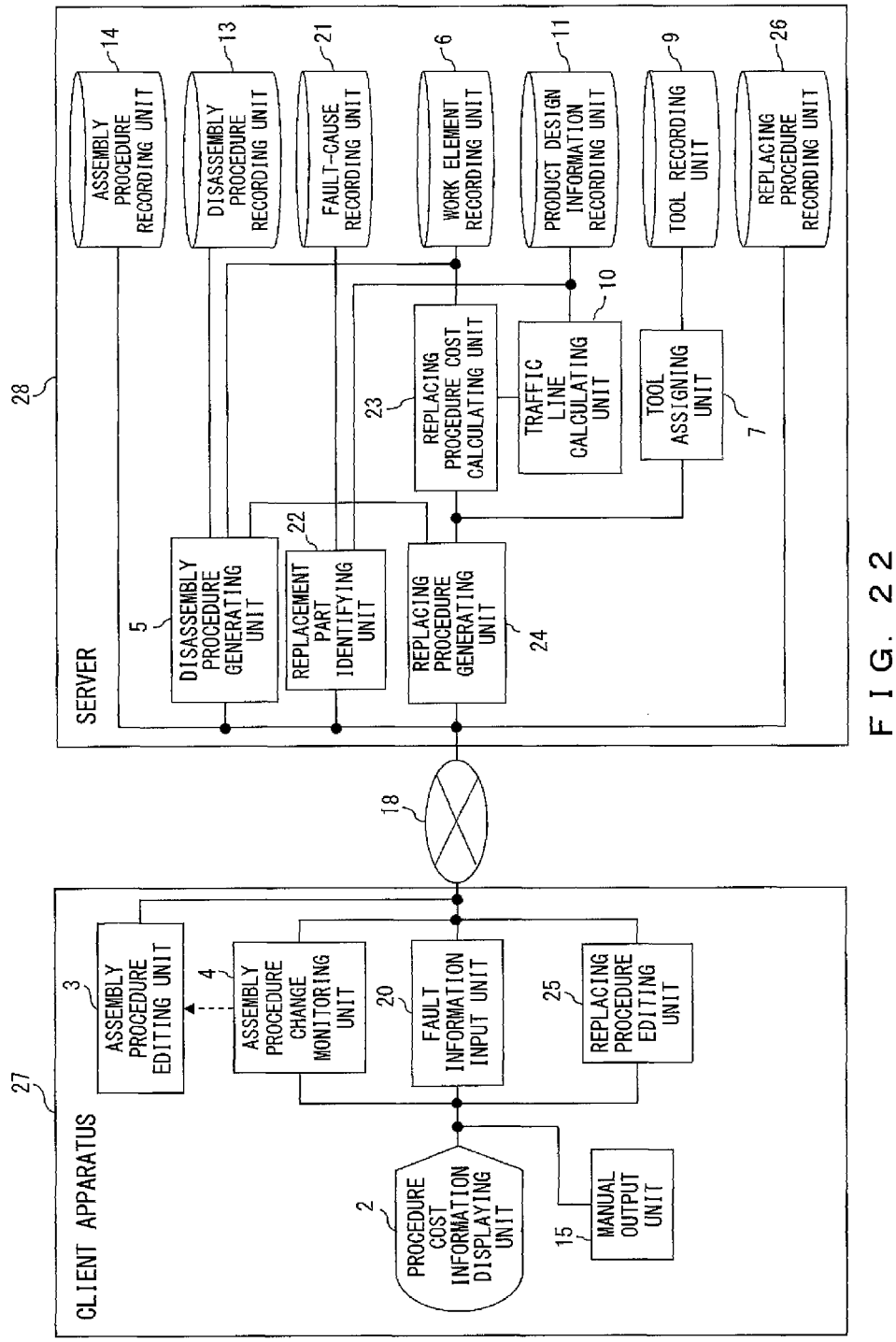
FIG. 22 illustrates a replacement procedure generating system in accordance with an embodiment.

FIG. 22 illustrates a replacement procedure generating system in accordance with an embodiment. In FIG. 22, like components are given like numerals used in FIG. 21, and descriptions thereof are omitted herein.

A disassembly procedure generating system depicted in FIG. 22 includes a client apparatus 27 and a server 28. The client apparatus 27 and the server 28 transmit data to and receive data from each other over the network 18, e.g., the Internet or a wireless LAN. The work element recording unit 6, the tool recording unit 9, the product design information recording unit 11, the disassembly procedure recording unit 13, the assembly procedure recording unit 14, the fault-cause recording unit 21, and the replacement procedure recording unit 26 may be configured by one recording unit, or may be installed in another client apparatus or another server over the network 18.

The client apparatus 27 includes the procedure cost information displaying unit 2 (displaying unit), the assembly procedure editing unit 3, the assembly procedure change monitoring unit 4, the manual output unit 15, the fault information input unit 20, and the replacement procedure editing unit 25.

The server 28 includes the disassembly procedure generating unit 5, the work element recording unit 6, the tool assigning unit 7, the tool recording unit 9, the traffic line calculating unit 10, the product design information recording unit 11, the disassembly procedure recording unit 13, the assembly procedure recording unit 14, the fault-cause recording unit 21, the replacement part identifying unit 22, the replacement procedure cost calculating unit 23, the replacement procedure generating unit 24, and the replacement procedure recording unit 26.

Figure 23:
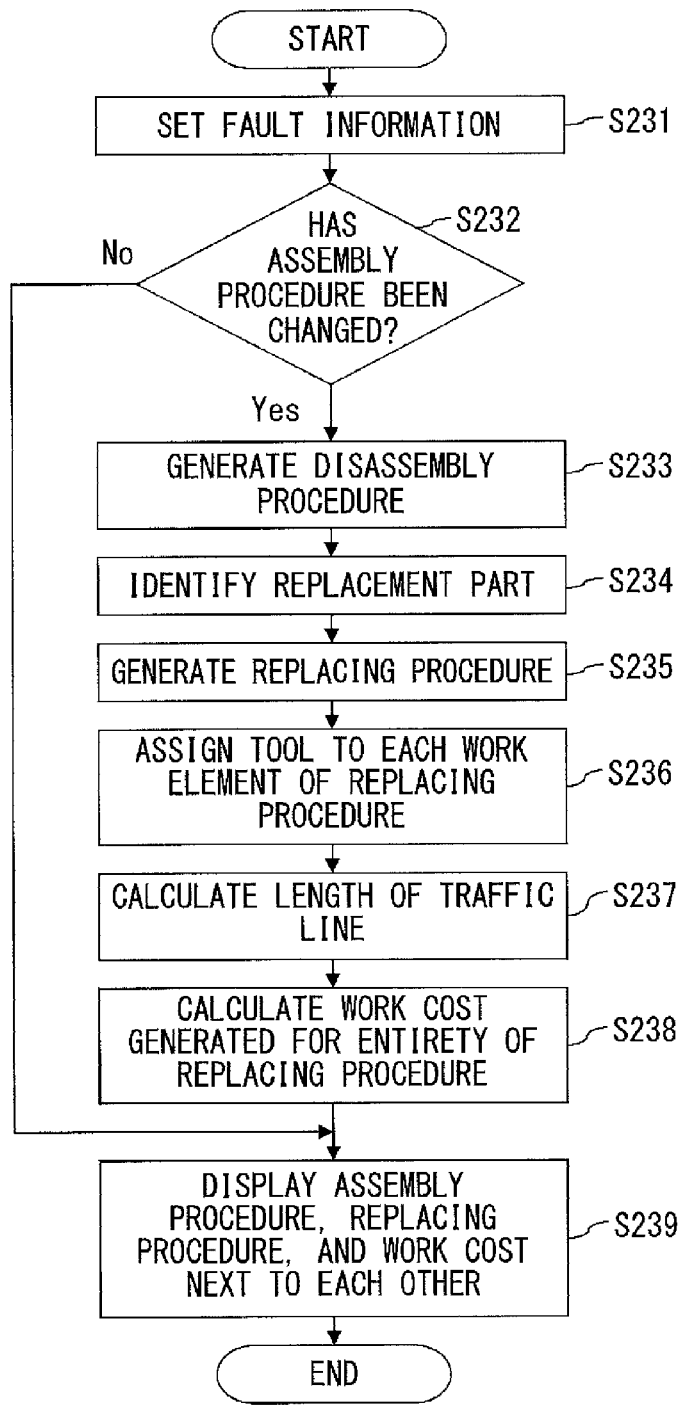
FIG. 23 is a flowchart illustrating operations of a replacement procedure generating apparatus or a replacement procedure generating system.

FIG. 23 is a flowchart illustrating operations of the replacement procedure generating apparatus 19 depicted in FIG. 21 or the replacement procedure generating system depicted in FIG. 22.

Figure 24:
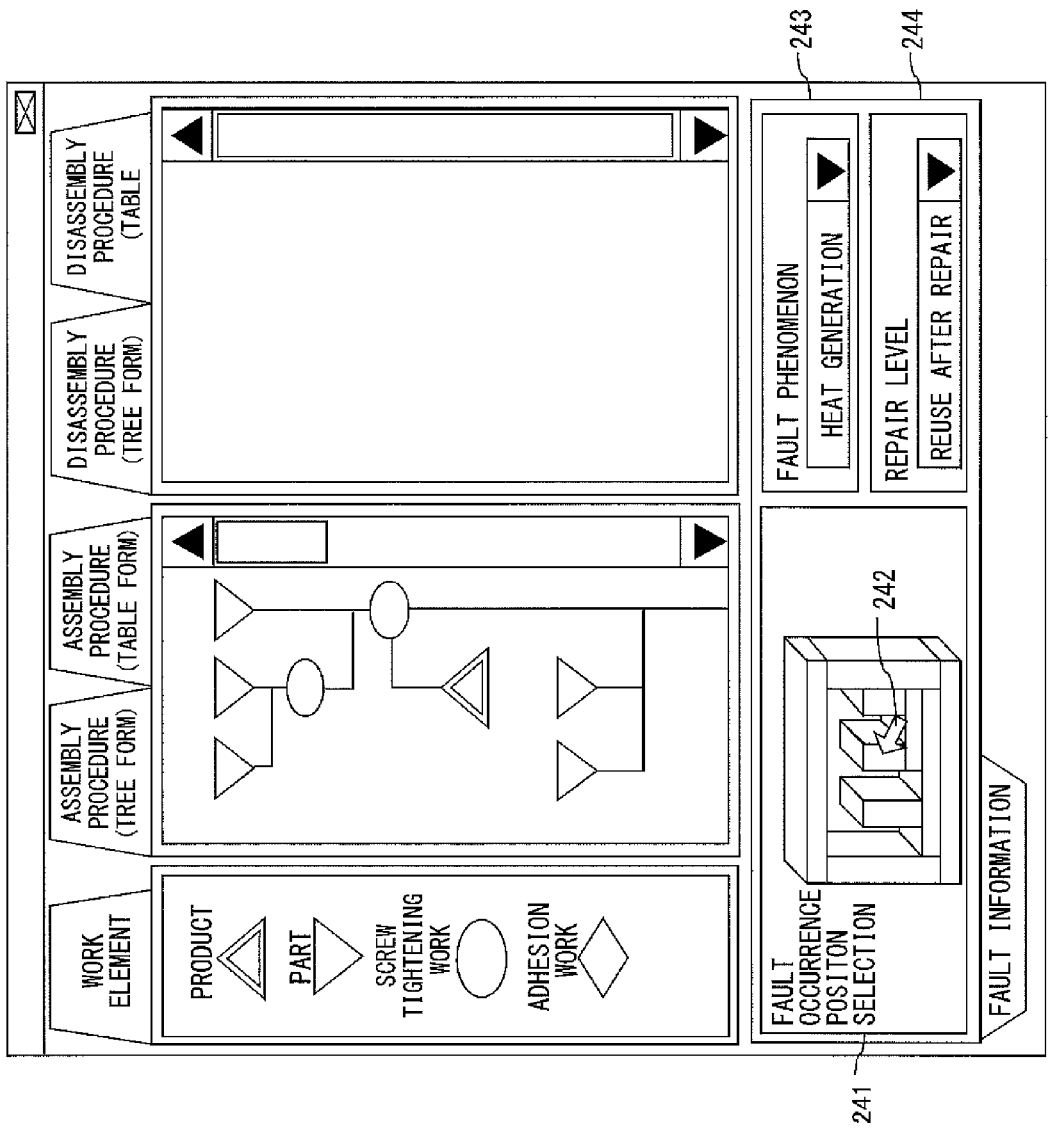
FIG. 24 illustrates an exemplary display screen of a procedure cost information displaying unit.

The fault information input unit 20 sets input fault information in an interactive process with a user performed via the procedure cost information displaying unit 2 (S231). In one possible example, by operating a pointer 242 using a pointing device, the user selects a part in which a fault has occurred from a plurality of parts indicated in a fault occurrence position selection area 241 displayed on the display screen of the procedure cost information displaying unit 2 depicted in FIG. 24. Accordingly, the fault information input unit 20 sets the position of the selected part (e.g., a barycentric position of a part C in three-dimensional space coordinates indicated by conclusion position information depicted in FIG. 25) as a fault phenomenon occurrence position in fault information. The user also selects a fault phenomenon (corresponding to "HEAT GENERATION" in the exemplary display in FIG. 24) in a dropdown menu provided in a fault phenomenon selection area 243 displayed on the display screen of the procedure cost information displaying unit 2 illustrated in FIG. 24. Accordingly, the fault information input unit 20 sets the selected fault phenomenon in fault information. The user also selects a repair level (corresponding to "REUSE AFTER REPAIR" in the exemplary display in FIG. 24) in a dropdown menu provided in a repair level selection area 244 displayed on the display screen of the procedure cost information displaying unit 2 illustrated in FIG. 24. Accordingly, the fault information input unit 20 sets the selected repair level in fault information.

Referring to FIG. 23, when the assembly procedure change monitoring unit 4 determines that an assembly procedure has been changed (Yes in S232), the assembly procedure change monitoring unit 4 transmits information to that effect to the disassembly procedure generating unit 5.

Upon receipt of information indicating that the assembly procedure has been changed, the disassembly procedure generating unit 5 creates a disassembly procedure (S233).

Figure 25:
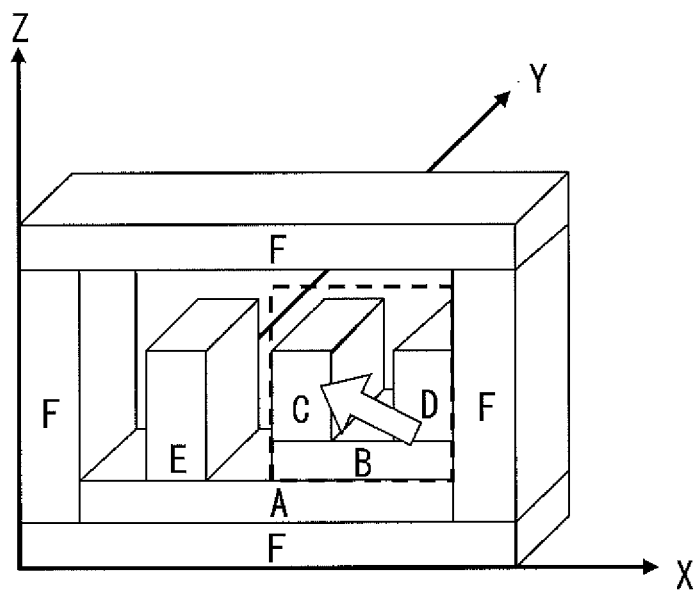
FIG. 25 illustrates an example of conclusion position information.

The replacement part identifying unit 22 identifies a replacement part according to the fault information set in S231, conclusion position information of a target part recorded by the product design information recording unit 11, and fault-cause information recorded by the fault-cause recording unit 21 (S234). In one possible example, the replacement part identifying unit 22 extracts all parts within a predetermined distance from the fault phenomenon occurrence position included in fault information and the barycentric position of each part included in conclusion position information. Next, the replacement part identifying unit 22 extracts a part from all of the extracted parts whose fault cause is identical with an input fault phenomenon in accordance with, for example, fault-cause information in which "PART NAME", "FAULT PHENOMENON", "CAUSATIVE PART", "CAUSE", "REPAIR STATE", and "REPAIR COST" are associated with each other as depicted in FIG. 26, and defines the extracted part as a faulty part. The replacement part identifying unit 22 also extracts a "CAUSATIVE PART" and "REPAIR STATE" corresponding to the faulty part from, for example, fault-cause information depicted in FIG. 26, and identifies the extracted "CAUSATIVE PART" as a replacement part. In a case where, for example, the user inputs "HEAT GENERATION" as a fault phenomenon, when the replacement part identifying unit 22 extracts parts B, C, and D from among parts A-F in the conclusion position information depicted in FIG. 25, the replacement part identifying unit 22 identifies the part C, i.e., a part corresponding to "HEAT GENERATION", as a faulty part. The replacement part identifying unit 22 refers to the fault-cause information depicted in FIG. 26, extracts the part B as a "FAULTY PART" corresponding to the part C, and identifies the part B as a replacement part. The "REPAIR STATE" of the "PART B", i.e., a part identified as a replacement part, is "CARRY IN". "CARRY IN" means that the part cannot be replaced on-site (field). Accordingly, the conclusion position information depicted in FIG. 25 is referred to, and a "UNIT II", i.e., a part group that includes the part B and that can be replaced on-site (parts B, C, and D), is identified as a replacement part.

Figure 28:
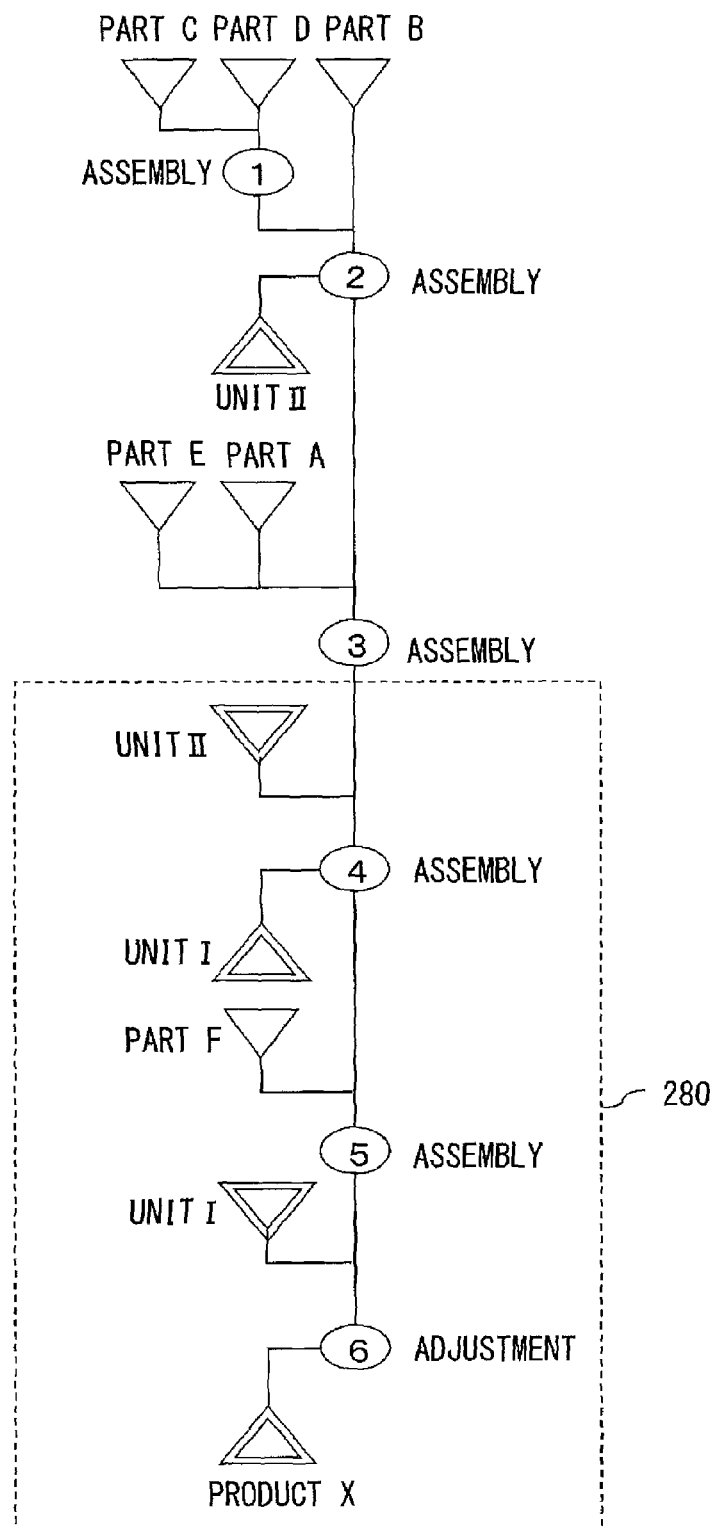
FIG. 28 illustrates an exemplary assembly procedure in a tree form.
Figure 29:
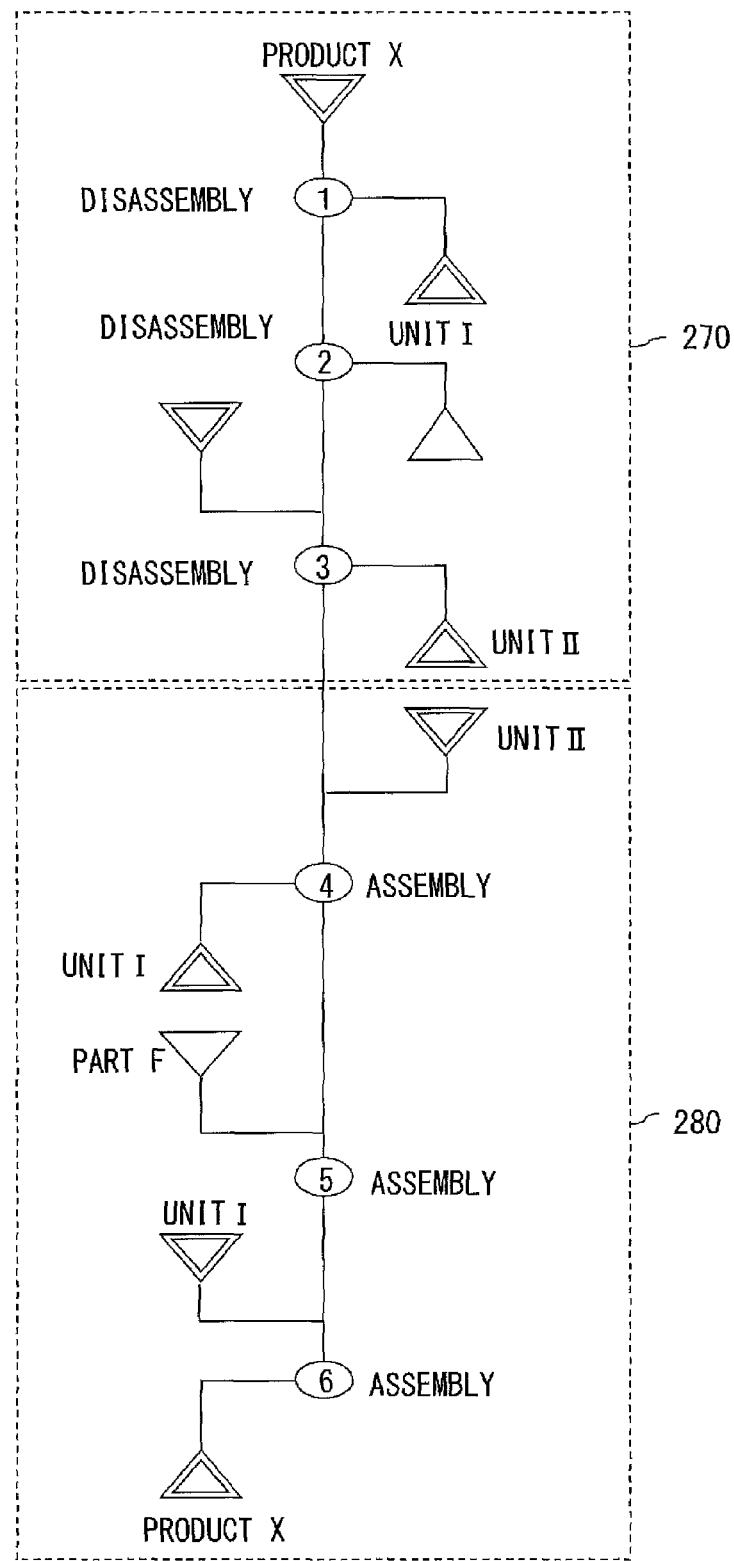
FIG. 29 illustrates an exemplary replacement procedure in a tree form.

Next, referring to FIG. 23, the replacement procedure generating unit 24 extracts, from the disassembly procedure, a process up to the removing of a replacement part from the product, extracts, from the assembly procedure, a process from the attaching of a replacement part to the completing of the product, and defines a combination of these two processes as a replacement procedure (S235). In one possible example, the replacement procedure generating unit 24 extracts, from the disassembly procedure depicted in FIG. 27, a process 270, i.e., a process up to the removing of the replacement part "UNIT II" from the product, extracts a process 280, i.e., a process from the attaching of "UNIT II" to the completing of the product, from the assembly procedure depicted in FIG. 28, and generates a replacement procedure such as that depicted in FIG. 29 by combining the two processes 270 and 280.

Referring to FIG. 23, the tool assigning unit 7 refers to tool information recorded by the tool recording unit 9 so as to assign a tool to be used at a repair location to each work element of the replacement procedure (S236).

The traffic calculating unit 10 calculates the lengths of traffic lines linking conclusion positions of all parts indicated by the disassembly procedure for which the replacement procedure is configured by the replacement procedure for which tools are assigned in S236 and conclusion positions of parts recorded in advance in the product design information recording unit 11 (S237).

Next, the replacement procedure cost calculating unit 23 multiplies the length of the traffic line calculated in S237 by a work cost per unit length of the traffic line recorded in advance in the product design information recording unit 11, in order to calculate a work cost C21 corresponding to the length of a traffic line linking the conclusion positions of all parts indicated by the disassembly procedure for which the replacement procedure is configured. The replacement procedure cost calculating unit 23 also calculates a work cost C22, i.e., the sum of work costs generated for individual work elements of the disassembly procedure for which the replacement procedure is configured. Meanwhile, the replacement procedure cost calculating unit 23 searches fault-cause information depicted in FIG. 26 for a repair cost C23 that depends on a repair level included in fault information. When, for example, "UNIT II" is identified as a replacement part and "REUSE AFTER REPAIR" is set as a "REPAIR LEVEL", the replacement procedure cost calculating unit 23 refers to the fault-cause information depicted in FIG. 26 and sets "ddd" as the repair cost C23. The replacement procedure cost calculating unit 23 defines the sum of the work cost C21, the work cost C22, and the repair cost C23 as a cost generated for the entirety of the replacement procedure (S238).

Figure 30:
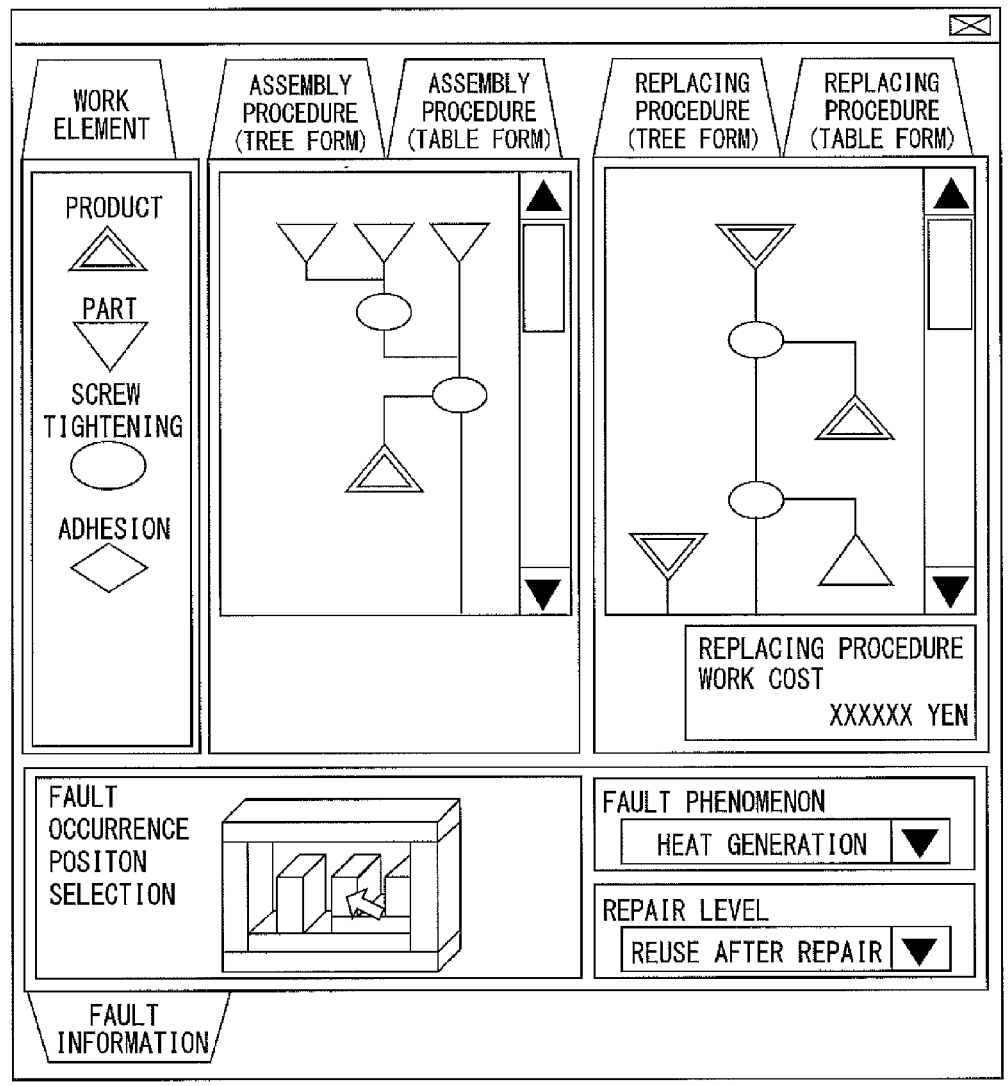
FIG. 30 illustrates an exemplary display screen of a procedure cost information displaying unit.
Figure 31:
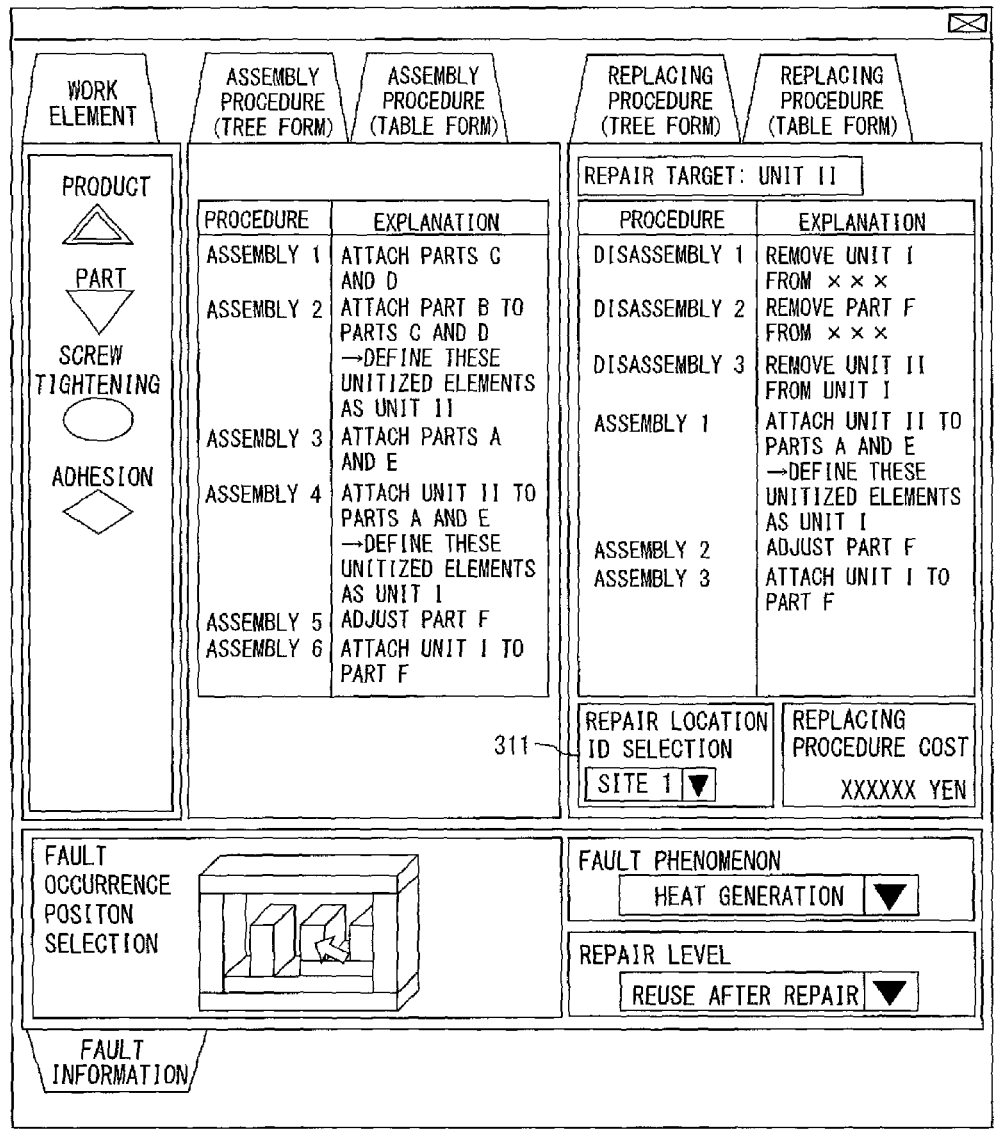
FIG. 31 illustrates an exemplary display screen of a procedure cost information displaying unit.

Referring to FIG. 23, the procedure cost information displaying unit 2 displays, together with the assembly procedure, the replacement procedure and the cost generated for the entirety of the replacement procedure (S239). In one possible example, the procedure cost information displaying unit 2 displays, as depicted in FIG. 30, a tree-form assembly procedure, a tree-form replacement procedure, and a cost generated for the entirety of the replacement procedure next to each other, or displays, as depicted in FIG. 31, a table-form assembly procedure, a table-form replacement procedure, and a cost generated for the entirety of the replacement procedure next to each other. In the example depicted in FIG. 31, a repair location ID is selectable in a dropdown menu provided within a repair location selection area 311 so that tools for the replacement procedure can be displayed in accordance with selected repair location IDs.

Figure 32:
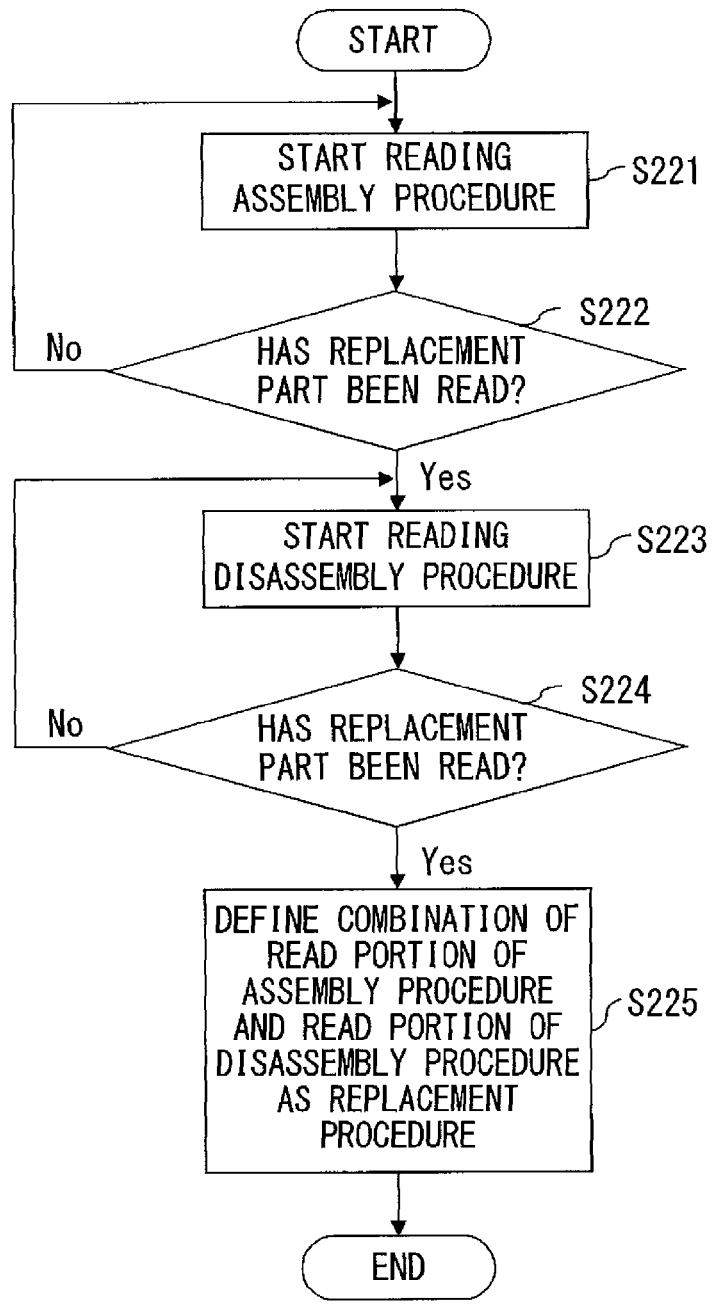
FIG. 32 is a flowchart illustrating exemplary operations of a replacement procedure generating unit.

FIG. 32 is a flowchart illustrating exemplary operations of the replacement procedure generating unit 24.

The replacement procedure generating unit 24 starts reading an assembly procedure from the assembly procedure recording unit 14 (S221). When a replacement part is read during the assembly procedure (Yes in S222), the replacement procedure generating unit 24 ends the reading of the assembly procedure and starts reading a disassembly procedure from the disassembly procedure recording unit 13 (S223). In, for example, an XML-form disassembly procedure depicted in FIG. 33, when a replacement part "UNIT II" (data on the 13-th line from the top) is read, the replacement procedure generating unit 24 ends the reading of an assembly procedure and starts reading the disassembly procedure.

When a replacement part is read in the disassembly procedure (Yes in S224), the replacement procedure generating unit 24 ends the reading of the disassembly procedure and records a combination of a read portion of the assembly procedure and a read portion of the disassembly procedure in the replacement procedure recording unit 26 as a replacement procedure (S225). In, for example, the XML-form assembly procedure depicted in FIG. 34, when the replacement part "UNIT II" (data on the 13-th line from the top) is read, the replacement procedure generating unit 24 ends the reading of the disassembly procedure and defines a combination of a read portion 331 of the disassembly procedure depicted in FIG. 33 and a read portion 341 of the assembly procedure depicted in FIG. 34 as a replacement procedure such as that illustrated in FIG. 35. Note that an order in which work elements of the read portion 341 of the assembly procedure depicted in FIG. 35 are arranged is opposite to an order in which work elements of the read portion 341 of the assembly procedure depicted in FIG. 34 are arranged.

As described above, the replacement procedure generating apparatus 19 depicted in FIG. 21 or the replacement procedure generating system depicted in FIG. 22 displays, together with an assembly procedure, a replacement procedure and a cost generated for the entirety of the replacement procedure on the display screen of the procedure cost information displaying unit 2, so that the user can evaluate and/or edit the replacement procedure according to the cost in parallel with generation of an assembly procedure, thereby creating a repair manual that allows a service technology to become highly usable. That is, the replacement procedure generating apparatus 19 depicted in FIG. 21 or the replacement procedure generating system depicted in FIG. 22 can efficiently generate a disassembly procedure for which usability for service technicians is considered.

The replacement procedure generating apparatus 19 depicted in FIG. 21 or the replacement procedure generating system depicted in FIG. 22 identifies a replacement part according to a fault phenomenon occurrence position and generates a replacement procedure according to the replacement part, so that a replacement procedure can be generated even for a fault that does not correspond to an error code.

A computer that configures the disassembly procedure generating apparatus 1 in accordance with the embodiment, the client apparatus 16, the server 17, the replacement procedure generating apparatus 19, the client apparatus 27, and the server 28 may be, for example, a personal computer or tablet terminal that includes a central processing unit (CPU), a main storage apparatus, a recording apparatus, a displaying apparatus, an input apparatus, a network interface, and an information transmission channel that connects these elements to each other.

The central processing unit consists of, for example, a microprocessor and controls the computer by executing a part list creation program stored in the main storage apparatus so as to achieve the assembly procedure editing unit 3, the assembly procedure change monitoring unit 4, the disassembly procedure generating unit 5, the tool assigning unit 7, the disassembly procedure cost calculating unit 8, the traffic line calculating unit 10, the disassembly procedure editing unit 12, the manual output unit 15, the fault information input unit 20, the replacement part identifying unit 22, the replacement procedure cost calculating unit 23, the replacement procedure generating unit 24, and the replacement procedure editing unit 25.

The main storage apparatus consists of, for example, a semiconductor memory and stores data to be accessed by the part list creation program.

The recording apparatus consists of, for example, a non-volatile recording apparatus and configures the work element recording unit 6, the tool recording unit 9, the product design information recording unit 11, the disassembly procedure recording unit 13, the assembly procedure recording unit 14, the fault-cause recording unit 21, and the replacement procedure recording unit 26.

The input apparatus consists of, for example, a keyboard or mouse.

The display apparatus consists of, for example, a display and configures the procedure cost information displaying unit 2.

In one possible example, the network interface transmits information to an external terminal over a network, and receives information from an external client terminal or server over the network 18.

The present invention enables efficient generation of a disassembly procedure or replacement procedure for which usability for service technicians is considered.

What is claimed is:

1. A disassembly procedure generating method for generating a disassembly procedure associated with a product assembly procedure, the disassembly procedure generating method being used by a computer that includes a recording unit and a displaying unit, and comprising:
    inserting a new work element into the assembly procedure in accordance with an input instruction;
    performing monitoring as to whether a new work element has been inserted into the assembly procedure;
    when a new work element is inserted into the assembly procedure, generating a disassembly procedure by using work elements of the assembly procedure into which the new work element has been inserted and by using information associating the work elements of the assembly procedure with work elements of the disassembly procedure and that is recorded in advance in the recording unit;
    calculating a cost generated for an entirety of the disassembly procedure;
    causing the displaying unit to simultaneously display, together with the assembly procedure, the disassembly procedure and the cost generated for the entirety of the disassembly procedure;
    editing the displayed disassembly procedure through an interactive process with a user performed via the displaying unit, and recording the edited disassembly procedure, wherein the user can edit the disassembly procedure in parallel with generation of the assembly procedure; and
    outputting a repair manual that includes the assembly procedure, the disassembly procedure, and the cost generated for the entirety of the disassembly procedure.

2. The disassembly procedure generating method according to claim 1, further comprising:
    assigning a tool to each work element of the disassembly procedure by referring to information recorded in the recording unit in advance and associating tools to be used in the assembly procedure and tools to be used in the disassembly procedure with each other; and
    causing the displaying unit to display a tool together with the assembly procedure, the disassembly procedure, and the cost generated for the entirety of the disassembly procedure.

3. The disassembly procedure generating method according to claim 1, wherein:
    said calculating the cost generated for the entirety of the disassembly procedure defines, as the cost generated for the entirety of the disassembly procedure, a sum of total work costs generated for individual work elements of the disassembly procedure and a value obtained by multiplying a work cost per unit traffic line by a length of a traffic line linking conclusion positions of all parts indicated for the disassembly procedure.

4. A disassembly procedure generating apparatus that generates a disassembly procedure associated with an assembly procedure, the disassembly procedure generating apparatus comprising:
    a recording unit to record information associating work elements of the assembly procedure and work elements of the disassembly procedure with each other;
    an assembly procedure editing unit to incorporate a new work element into the assembly procedure in accordance with an input instruction;
    an assembly procedure change monitoring unit to perform monitoring as to whether a new work element has been inserted into the assembly procedure;
    a disassembly procedure generating unit to generate, when a new work element is inserted into the assembly procedure, a disassembly procedure using information recorded in the recording unit and the work elements of the assembly procedure into which the new work element has been inserted;
    a disassembly procedure cost calculating unit to calculate a cost generated for an entirety of the disassembly procedure;
    a displaying unit to simultaneously display, together with the assembly procedure, the disassembly procedure and the cost generated for the entirety of the disassembly procedure;
    a disassembly procedure editing unit that edits the displayed disassembly procedure through an interactive process with a user performed via the displaying unit, and records the edited disassembly procedure, wherein the user can edit the disassembly procedure in parallel with generation of the assembly procedure; and
    an output unit that outputs a repair manual that includes the assembly procedure, the disassembly procedure, and the cost generated for the entirety of the disassembly procedure.

5. A disassembly procedure generating system that includes a client apparatus and a server and that generates a disassembly procedure associated with an assembly procedure, the client apparatus and the server transmitting data to and receiving data from each other over a network,
    wherein the client apparatus includes:
        an assembly procedure editing unit that incorporates a new work element into the assembly procedure in accordance with an input instruction,
        an assembly procedure change monitoring unit that performs monitoring as to whether a new work element has been inserted into the assembly procedure, and
        a displaying unit,
    wherein the server includes:
        a recording unit that records information associating work elements of the assembly procedure and work elements of the disassembly procedure with each other,
        a disassembly procedure generating unit that, when the client apparatus transmits information indicating that a new work element has been inserted into the assembly procedure, generates a disassembly procedure using information recorded in the recording unit and the work elements of the assembly procedure into which the new work element has been inserted, and a disassembly procedure cost calculating unit that calculates a cost generated for an entirety of the disassembly procedure, and wherein:
after the disassembly procedure and the cost are transmitted from the server to the client apparatus, the displaying unit simultaneously displays, together with the assembly procedure, the cost generated for the entirety of the disassembly procedure: and the client apparatus further includes:
a disassembly procedure editing unit that edits the displayed disassembly procedure through an interactive process with a user performed via the displaying unit, and records the edited disassembly procedure, wherein the user can edit the disassembly procedure in parallel with generation of the assembly procedure; and an output unit that outputs a repair manual that includes the assembly procedure, the disassembly procedure, and the cost generated for the entirety of the disassembly procedure.

\* \* \* \* \*